(12) United States Patent
Ohara et al.

(10) Patent No.: US 7,461,194 B2
(45) Date of Patent: Dec. 2, 2008

(54) APPARATUS FOR INTERCONNECTING A PLURALITY OF PROCESS NODES BY SERIAL BUS

(75) Inventors: Shigeyoshi Ohara, Kawaski (JP); Kazunori Masuyama, Kahoku (JP)

(73) Assignee: Fujitsu Limited, Kawasaki (JP)

( * ) Notice: Subject to any disclaimer, the term of this patent is extended or adjusted under 35 U.S.C. 154(b) by 185 days.

(21) Appl. No.: 11/133,335

(22) Filed: May 20, 2005

(65) Prior Publication Data

US 2006/0174048 A1 Aug. 3, 2006

(30) Foreign Application Priority Data

Jan. 28, 2005 (JP) .............................. 2005-020512

(51) Int. Cl.
*G06F 13/14* (2006.01)
*G06F 13/00* (2006.01)

(52) U.S. Cl. .................... 710/305; 710/31; 710/316

(58) Field of Classification Search .................. 710/3, 710/20, 22, 23, 52, 104, 260, 313, 317, 305, 710/306, 315, 316, 1, 26, 308; 709/203, 709/209; 370/392, 463, 235, 362, 254, 255, 370/389; 714/44, 799; 713/1, 300; 712/11; 340/2.7; 326/86

See application file for complete search history.

(56) References Cited

U.S. PATENT DOCUMENTS

| | | | | | |
|---|---|---|---|---|---|
| 5,446,915 | A | * | 8/1995 | Pierce | 712/11 |
| 5,742,587 | A | * | 4/1998 | Zornig et al. | 370/235 |
| 5,951,683 | A | | 9/1999 | Yuuki et al. | |
| 6,055,583 | A | * | 4/2000 | Robbins | 710/22 |
| 6,108,722 | A | * | 8/2000 | Troeller et al. | 710/26 |
| 6,265,885 | B1 | * | 7/2001 | Luo et al. | 324/719 |
| 6,600,739 | B1 | * | 7/2003 | Evans et al. | 370/362 |
| 6,601,126 | B1 | * | 7/2003 | Zaidi et al. | 710/305 |
| 6,654,818 | B1 | * | 11/2003 | Thurber | 710/3 |
| 6,697,906 | B1 | * | 2/2004 | Ayukawa et al. | 710/316 |
| 6,732,218 | B2 | * | 5/2004 | Overtoom et al. | 710/313 |
| 6,760,793 | B2 | * | 7/2004 | Kelley et al. | 710/52 |
| 6,845,409 | B1 | * | 1/2005 | Talagala et al. | 710/20 |
| 6,856,619 | B1 | * | 2/2005 | Haugseth et al. | 370/389 |
| 6,900,664 | B2 | * | 5/2005 | Wu | 326/86 |

(Continued)

FOREIGN PATENT DOCUMENTS

EP 1768398 A1 * 3/2007

(Continued)

OTHER PUBLICATIONS

PCI-SIG, PCI Express Base Specification, Apr. 15, 2003, published by PCI-SIG, Revision 1.0a, pp. 119-123.*

(Continued)

*Primary Examiner*—Mark Rinehart
*Assistant Examiner*—Faisal M Zaman
(74) *Attorney, Agent, or Firm*—Staas & Halsey LLP

(57) ABSTRACT

Before the link of each port of a switch provide with a plurality of ports for interconnecting a plurality of process nodes by a serial bus is established, it is checked whether each process node is mounted. Then, of the plurality of ports, a port to which one of mounted process nodes is connected is assigned as an upstream port and the other ports are assigned as downstream ports.

11 Claims, 20 Drawing Sheets

U.S. PATENT DOCUMENTS

| | | | |
|---|---|---|---|
| 6,941,350 B1* | 9/2005 | Frazier et al. | 709/209 |
| 6,959,355 B2* | 10/2005 | Szabelski | 710/313 |
| 6,961,801 B1* | 11/2005 | Frink | 710/308 |
| 7,002,926 B1* | 2/2006 | Eneboe et al. | 370/255 |
| 7,058,738 B2* | 6/2006 | Stufflebeam, Jr. | 710/104 |
| 7,065,597 B2* | 6/2006 | Kumar et al. | 710/260 |
| 7,096,308 B2* | 8/2006 | Main et al. | 710/315 |
| 7,099,969 B2 | 8/2006 | McAfee et al. | |
| 7,103,064 B2* | 9/2006 | Pettey et al. | 370/463 |
| 7,152,190 B2* | 12/2006 | Overtoom | 714/44 |
| 7,155,553 B2* | 12/2006 | Lueck et al. | 710/305 |
| 7,167,941 B2* | 1/2007 | Iskiyan et al. | 710/316 |
| 7,167,975 B2* | 1/2007 | Hamdi et al. | 713/1 |
| 2002/0013868 A1* | 1/2002 | West | 710/23 |
| 2002/0063621 A1* | 5/2002 | Tseng et al. | 340/2.7 |
| 2004/0030742 A1* | 2/2004 | Kitagawa | 709/203 |
| 2004/0039986 A1* | 2/2004 | Solomon et al. | 714/799 |
| 2004/0179529 A1* | 9/2004 | Pettey et al. | 370/392 |
| 2005/0125590 A1* | 6/2005 | Li et al. | 710/317 |
| 2005/0154930 A1* | 7/2005 | Morrow | 713/300 |
| 2005/0172047 A1* | 8/2005 | Pettey | 710/20 |
| 2005/0235091 A1* | 10/2005 | Chen et al. | 710/313 |
| 2005/0246460 A1* | 11/2005 | Stufflebeam, Jr. | 710/104 |
| 2005/0270988 A1* | 12/2005 | DeHaemer | 370/254 |
| 2006/0036796 A1* | 2/2006 | Riley | 710/306 |
| 2006/0059293 A1* | 3/2006 | Wurzburg et al. | 710/313 |
| 2006/0143311 A1* | 6/2006 | Madukkarumukumana et al. | 710/1 |

FOREIGN PATENT DOCUMENTS

| | | | | |
|---|---|---|---|---|
| GB | 2425696 A | * | 1/2006 | |
| JP | 63-83856 | | 4/1988 | |
| JP | 2-130666 | | 5/1990 | |
| JP | 7-219913 | | 8/1995 | |
| JP | 2001-229119 | | 8/2001 | |
| JP | 2005025405 A | * | 1/2005 | |
| JP | 2005287278 A | * | 10/2005 | |
| KR | 10-2005-044247 | | 5/2005 | |

OTHER PUBLICATIONS

Remple, T.B., "USB on-the-go interface for portable devices," Consumer Electronics, 2003. ICCE. 2003 IEEE International Conference on , pp. 8-9, Jun. 17-19, 2003.*

Tual et al., "USB full speed enabled smart cards for consumer electronics applications," Consumer Electronics, 2005. (ISCE 2005). Proceedings of the Ninth International Symposium on , pp. 230-236, Jun. 14-16, 2005.*

Korean Office Action mailed on Aug. 31, 2006 in corresponding Korean patent application No. 10-2005-0039339.

Japanese Patent Office Action, mailed Aug. 7, 2007 and issued in corresponding Japanese Patent Application No. 2005-020512.

* cited by examiner

| | |
|---|---|
| | 0xFFFF_FFFF_FFFF_FFFF |
| Range of a packet which is routed to CPU 201-3 | |
| | 0xC000_0000_0000_0000 |
| | 0xBFFF_FFFF_FFFF_FFFF |
| Range of a packet which is routed to CPU 201-2 | |
| | 0x8000_0000_0000_0000 |
| | 0x7FFF_FFFF_FFFF_FFFF |
| Range of a packet which is routed to CPU 201-1 | |
| | 0x4000_0000_0000_0000 |
| | 0x3FFF_FFFF_FFFF_FFFF |
| Range of a packet which is routed to CPU 201-0 | |
| | 0x0000_0000_0000_0000 |

| Assign CM unit 201-0 to upstream | Assign CM unit 201-1 to upstream | Assign CM unit 201-2 to upstream | Assign CM unit 201-3 to upstream |
|---|---|---|---|
| Range of a packet which is routed CPU 201-3 | Range of a packet which is routed CPU 201-0 | Range of a packet which is routed CPU 201-1 | Range of a packet which is routed CPU 201-2 |
| Range of a packet which is routed CPU 201-2 | Range of a packet which is routed CPU 201-3 | Range of a packet which is routed CPU 201-0 | Range of a packet which is routed CPU 201-1 |
| Range of a packet which is routed CPU 201-1 | Range of a packet which is routed CPU 201-2 | Range of a packet which is routed CPU 201-3 | Range of a packet which is routed CPU 201-0 |
| Range of a packet which is routed CPU 201-0 | Range of a packet which is routed CPU 201-1 | Range of a packet which is routed CPU 201-2 | Range of a packet which is routed CPU 201-3 |

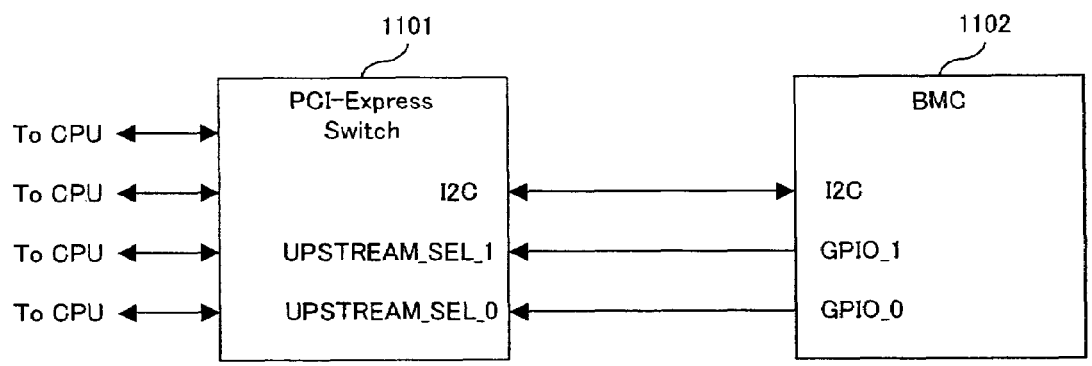
F I G. 1 2

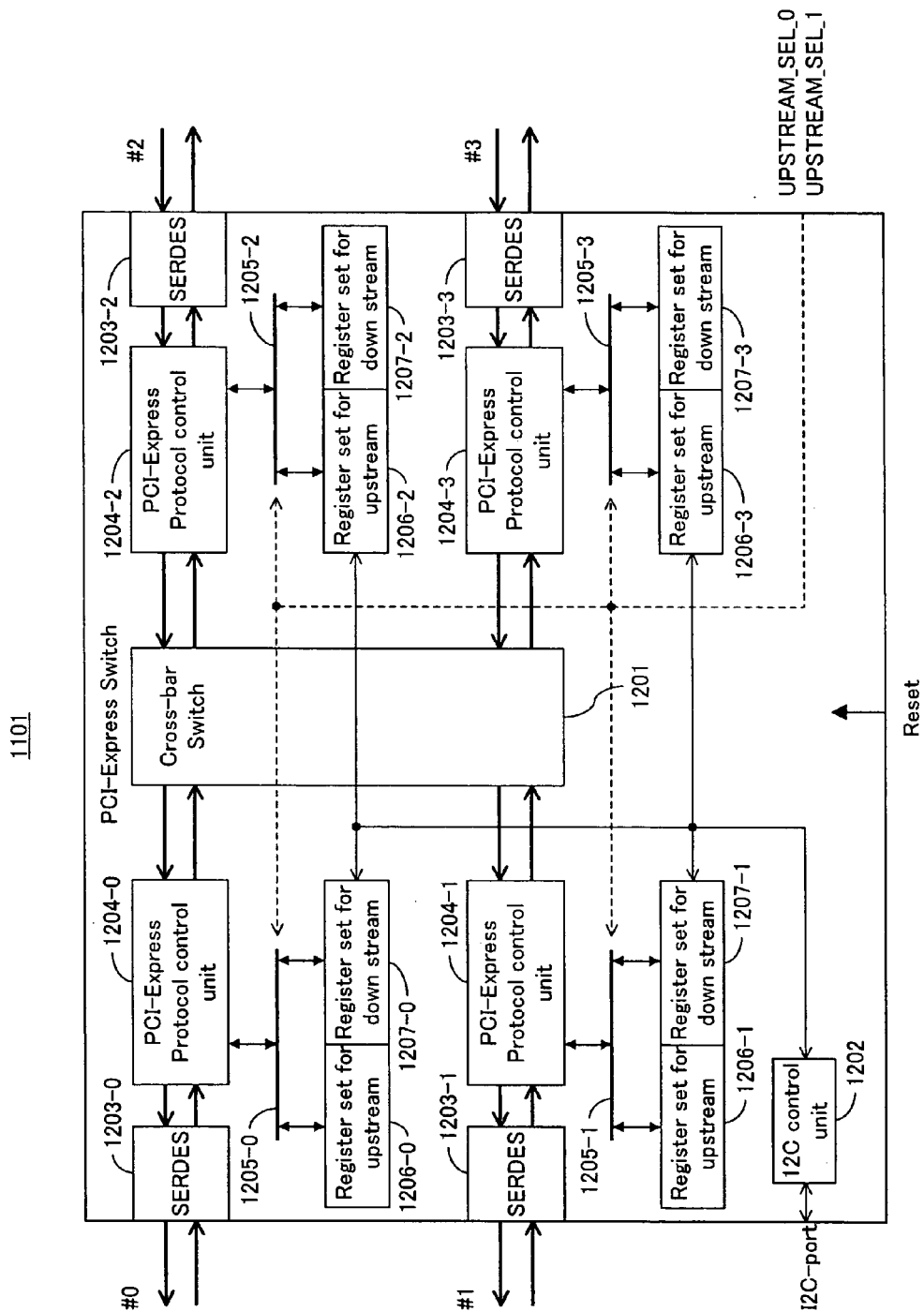
F I G. 13

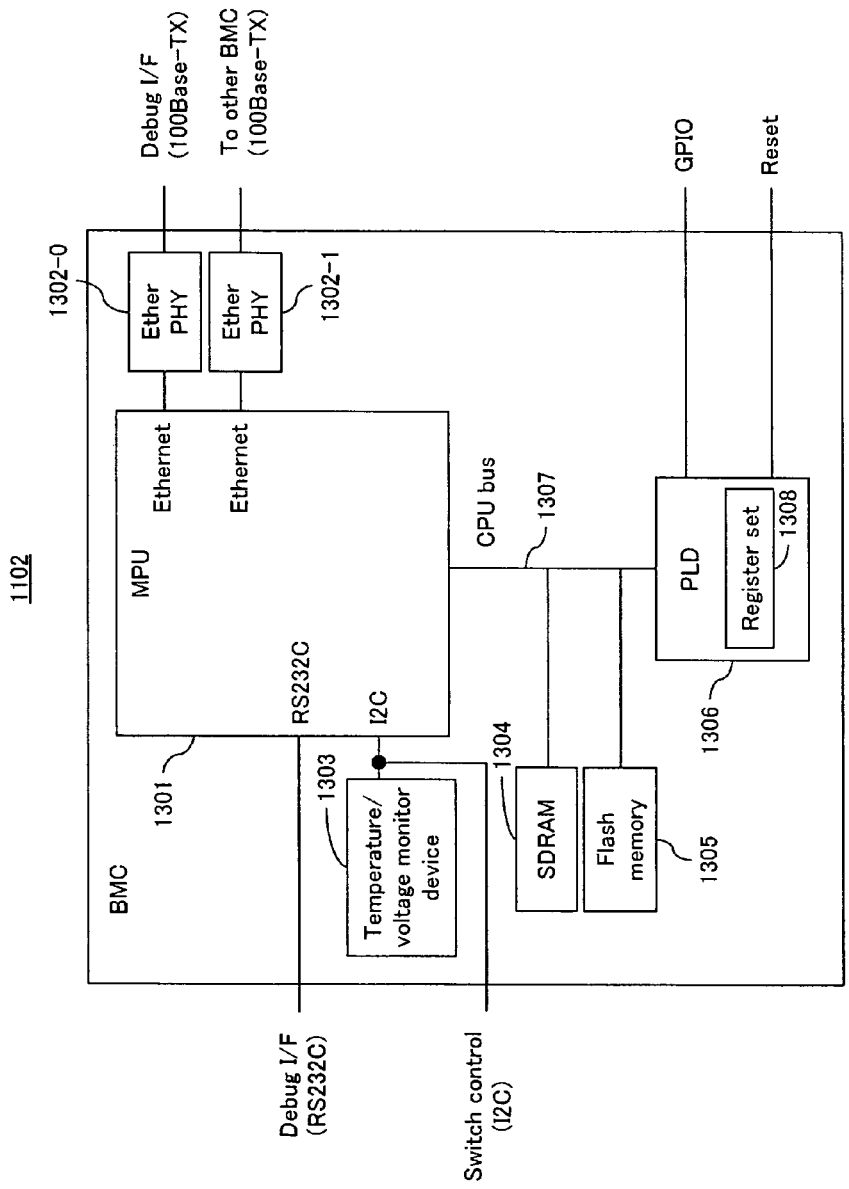
F I G. 1 4

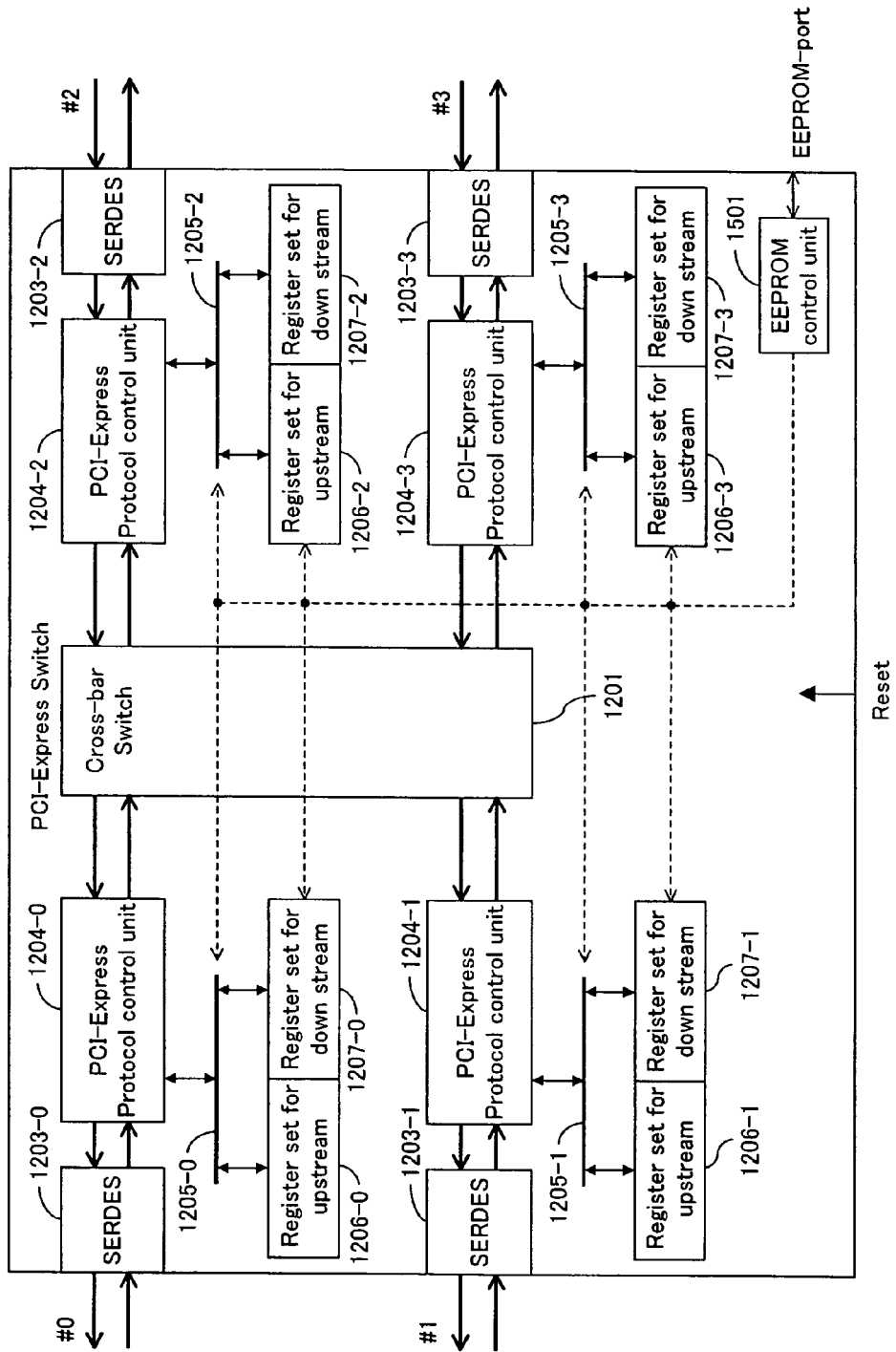
F I G. 16

APPARATUS FOR INTERCONNECTING A PLURALITY OF PROCESS NODES BY SERIAL BUS

BACKGROUND OF THE INVENTION

1. Field of the Invention

The present invention relates to a device for interconnecting the nodes a computer system composed of a plurality of central processing unit (CPU) nodes and a method thereof. More particularly, it relates to a peripheral component interconnect (PCI)-express switch used to interconnect nodes in a computer system in which a plurality of CPU nodes are connected by the PCI-express bus, which is a high-speed serial bus, and a control device thereof.

2. Description of the Related Art

With the recent development of the digitization of data, the amount of data to be processed by a computer system has continued to rapidly increase. In order to cope with this request, an interconnect technology for internally connecting the computer system has also continued to progress so as to enable high-speed and large-capacity data transfer.

Although conventionally a PCI bus has been widely used for an interconnect function inside a computer system, a serial type interconnect function whose installation cost is low despite its high speed and large capacity will become a mainstream in the near future. In particular, a PCI-express bus, which is a serial type interconnect function worked out as the successor of the PCI bus by special interest group (SIG) is expected to be widely used in various types of computer systems ranging from a desk-top personal computer (PC) to a large-scaled server and a storage device.

FIG. 1A shows the configuration of a conventional computer system using a PCI bus. The computer system shown in FIG. 1A comprises a CPU 11, a memory controller (MCH) 12, a plurality of pieces of memory 13-1~13-4 and an I/O controller (ICH) 14. The I/O controller 14 comprises a plurality of PCI buses, and a card mounting a PCI device can be mounted in PCI slots 15-1~15-4. The operational frequency of the PCI bus is 33~133 MHz, and has two types of bus width, 32 bits and 64 bits. The maximum bandwidth per slot of the bus is 1 GB/s in total for both directions.

In FIG. 1B, a PCI-express bus is used instead of the PCI bus shown in FIG. 1A. The computer system shown in FIG. 1B comprises a CPU 11, a memory controller 12 and memory 13-1~13-4. The memory controller 12 comprises a plurality of PCI-express buses, and a card mounting a PCI device can be mounted in PCI slots 16-1~16-4. The maximum bandwidth per slot of the bus is 1 GB/s for each direction.

The PCI-express bus, which is a serial bus, has a less number of signals than the PCI bus, which is a parallel bus. Therefore, the PCI-express bus has the effect of reducing the cost of hardware. For example, the number of chip sets can be reduced, the number of wires on a board can be reduced and a smaller connector can be used. Simultaneously, since bandwidth more than double of the PCI bus can be provided, the request for high speed and high performance can be satisfied.

In a system composed of a plurality of computers and a plurality of peripheral devices, a hub box capable of arbitrarily selecting peripheral devices used by each computer is also known (for example, see Patent reference 1).

Patent Reference 1:

Japanese Patent Application No. 2001-229119

As described above, the PCI-express bus is expected to be used in a wide field as a high-performance and low-cost interconnect function. However, since the PCI-express bus theoretically follows the architecture of the PCI bus, it has the following problems if it is used to connect a plurality of CPU nodes.

FIG. 1C shows the configuration of a virtual computer system in which CPU nodes 21-1~21-8 having the configuration shown in FIG. 1B are connected by a PCI-express switch 22 with a plurality of ports. In the specification of the PCI-express bus, one port of the switch 22 is called an upstream port, and plays a special role of initializing the entire system or the like. Therefore, a specific CPU node connected to the upstream port of the switch 22 occupies a privileged position, and the switch 22 cannot operate without this CPU node.

However, in a server or a storage device which is composed of a plurality of CPU nodes, each CPU node sometime is used as an extendable unit depending on its product configuration in order to improve the flexibility of a product. In this case, the PCI-express switch cannot operate without the specific CPU node, and as a result, the system cannot operate. Such a situation must be avoided.

SUMMARY OF THE INVENTION

It is an object of the present invention to enable a system to operate even if its configuration changes due to the increase/decrease of the number of CPU nodes in a computer system in which a plurality of CPU nodes are interconnected by a serial bus, such as a PCI-express bus.

The interconnect apparatus of the present invention comprises a switch unit and a control unit, and a plurality of process nodes are interconnected by a serial bus.

The switch unit comprises a plurality of ports connected to the process nodes. One of the ports is assigned as an upstream port, and the other ports are assigned as downstream ports. Then, a data transfer route is switched among the ports.

The control unit checks whether each process node is mounted before the link of each port of the switch unit is established. Then, the control unit controls the switch unit in such a way that, out of the plurality of ports, a port to which one of the mounted process nodes is connected may be assigned as an upstream port and the other ports may be assigned as downstream ports.

BRIEF DESCRIPTION OF THE DRAWING

FIG. 4 shows an address map.

FIG. 6 shows four types of address maps.

FIG. 12 shows the configuration of the first switch unit.

FIG. 13 shows the configuration of the first PCI-express switch.

FIG. 14 shows the configuration of the BMC.

FIG. 16 shows the configuration of the second PCI-express switch.

DESCRIPTION OF THE PREFERRED EMBODIMENTS

The preferred embodiments of the present invention are described in detail below with reference to the drawings.

Figure 1A:
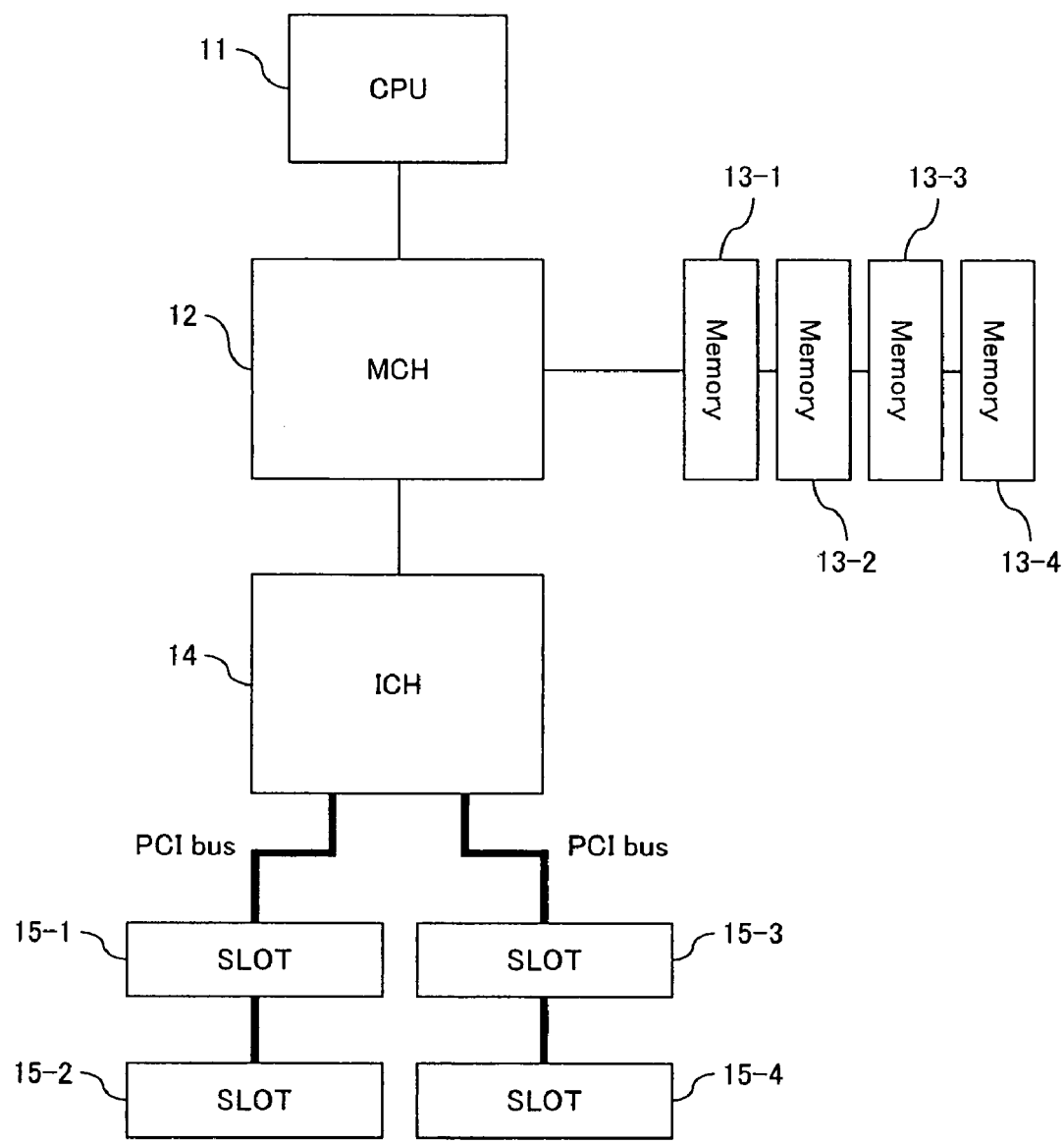
FIG. 1A shows the configuration of a computer system using a PCI bus.
Figure 1B:
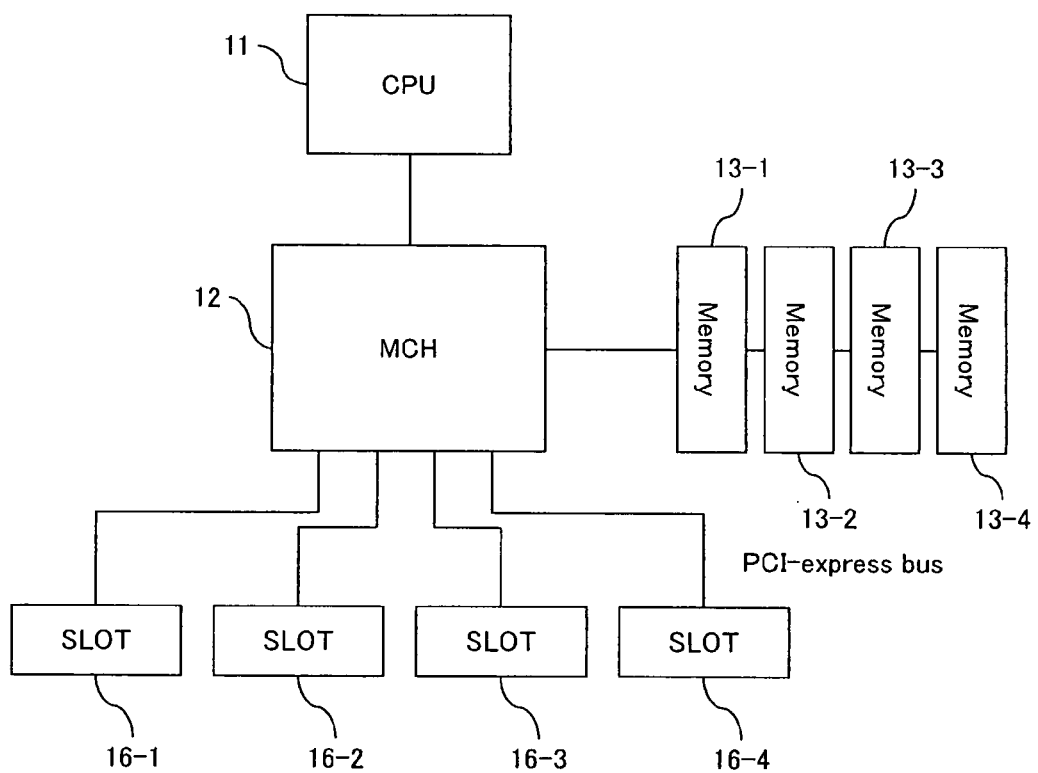
FIG. 1B shows the configuration of a computer system using a PCI-express bus.
Figure 1C:
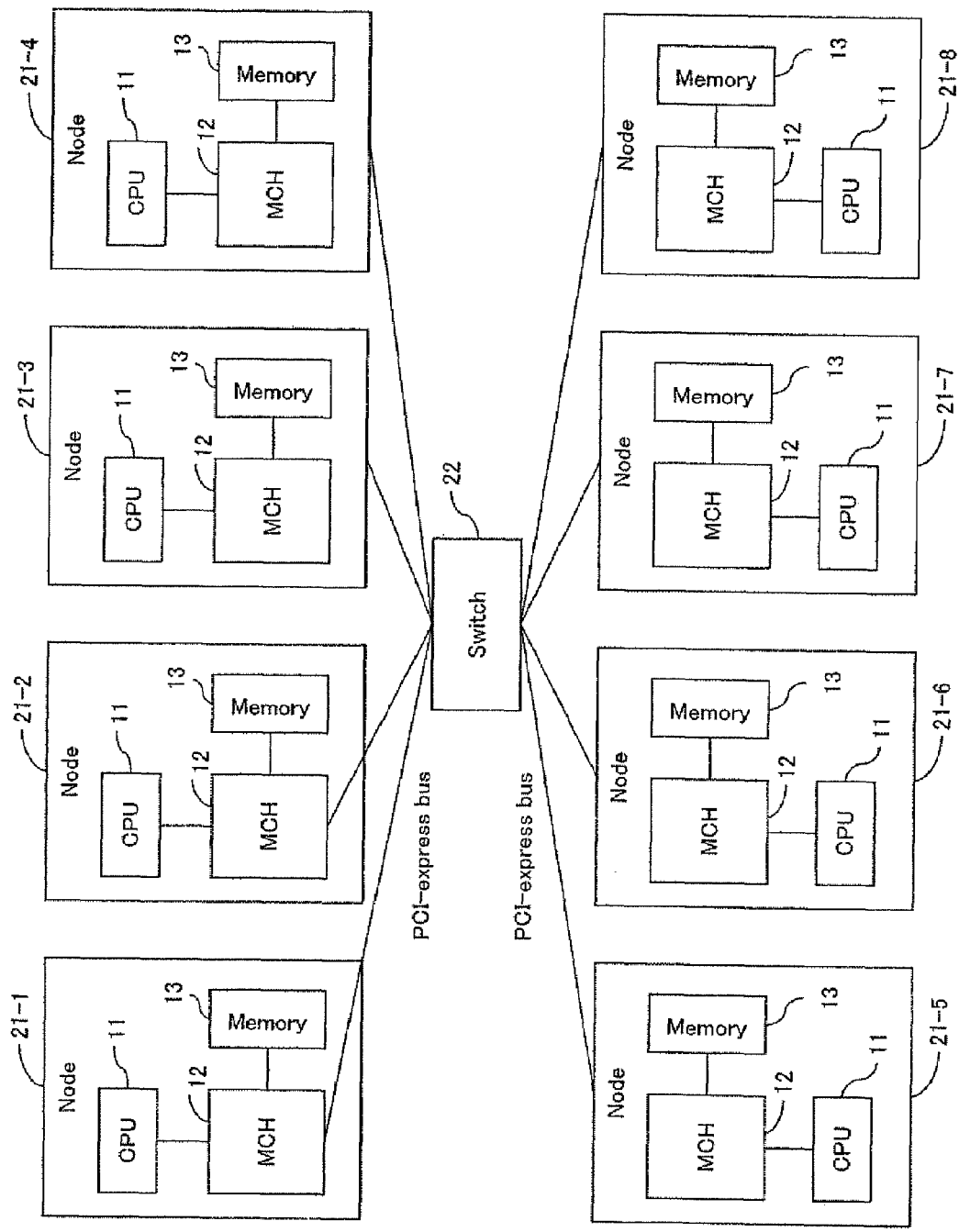
FIG. 1C shows the configuration of a computer system composed of a plurality of CPU nodes.
Figure 2A:
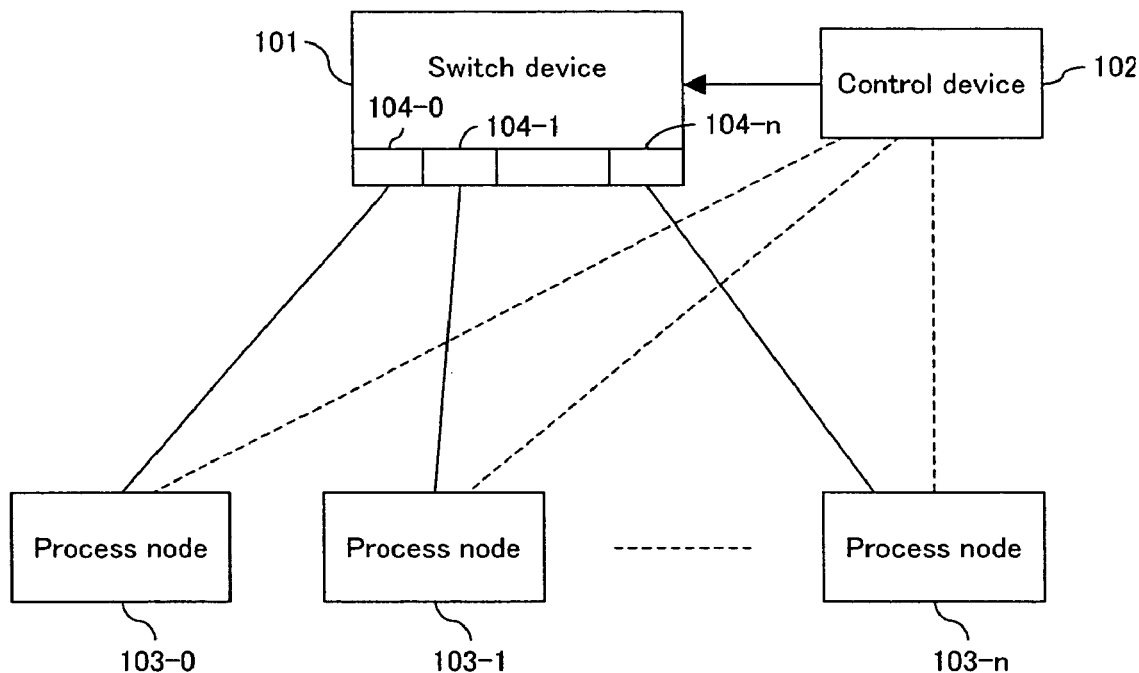
FIG. 2A shows the basic configuration of the interconnect apparatus of the present invention.

FIG. 2A shows the basic configuration of the interconnect apparatus of the present invention. The interconnect apparatus shown in FIG. 2A comprises a switch device 101 and a control device 102, and interconnects a plurality of process nodes 103-0~103-n by a serial bus.

The switch unit 101 comprises a plurality of ports 104-0~104-n connected to the process nodes 103-0~103-n. The switch device 101 assigns one of the ports as an upstream port and the other ports as downstream ports, and switches a data transfer route among the ports.

The control device 102 checks whether each of the process nodes 103-0~103-n is mounted before the link of each port of the switch device 101 is established. Then, the control device 102 controls the switch device 102 in such a way that, out of the ports 104-0~104-n of the switch device 101, a port to which one of the mounted process nodes is connected and the other ports may be assigned as an upstream port and down stream ports, respectively.

The control device 102 checks whether the process nodes 103-0~103-n are mounted, that is, whether they exist in the system before the link of the switch device 101 is established and can become switched. Then, out of the ports in which the existence of the process nodes is confirmed, the control device 102 selects a port to be assigned as an upstream port, and controls the switch device 101 in such a way that the port may operate as an upstream port and that the other ports may operate as downstream ports.

The interconnect apparatus corresponds, for example, to the switch unit 202-0 or 202-1 shown in FIG. 2B, which will be described later, and the process nodes 103-0~103-n correspond, for example, to the CPU unit 201-0~201-3 shown in FIG. 2B. The switch device 101 corresponds, for example, to the PCI-express switch 221-0 or 221-1, and the control device 102, corresponds, for example, to the BMC 222-0 or 222-1 shown in FIG. 2B.

According to the present invention, even when a system configuration changes due to the increase/decrease of the number of CPU nodes or the like in a computer system in which a plurality of CPU nodes are interconnected by a PCI-express switch, the CPU node of an upstream port can be assigned and the system can be operated. Thus, the peculiarity of an upstream port peculiar to the PCI-express specification is concealed.

In this preferred embodiment, a system in which a plurality of CPU nodes is connected by a PCI-express switch is assumed. Then, a board management controller (BMC) is mounted on the print-wired board unit of each CPU node (CPU unit) and the print-wired board unit of a PCI-express switch (switch unit).

The BMC is an autonomously operable module with a processor and an inter-BMC communication function, and resets each print-wired board unit and perform a variety of monitor/control. The BMC mounted on the switch unit has a function to switch the upstream port of the PCI-express switch and to configure it, a function to check which CPU unit is mounted and a function to check whether the link of each port of the PCI-express switch is established.

An address conversion module is mounted on the CPU unit at the joint with the PCI-express switch.

The BMC of the CPU unit communicates with that of the switch unit, and switches and configures the upstream port of the switch in such a way as to select an operable CPU unit as the device of the upstream port. Then, the BMC of the CPU unit sets the address conversion module of the CPU unit. Since even when the number of CPU units constituting a system changes, the CPU unit of the upstream port is assigned thus, the system can operate.

Figure 2B:
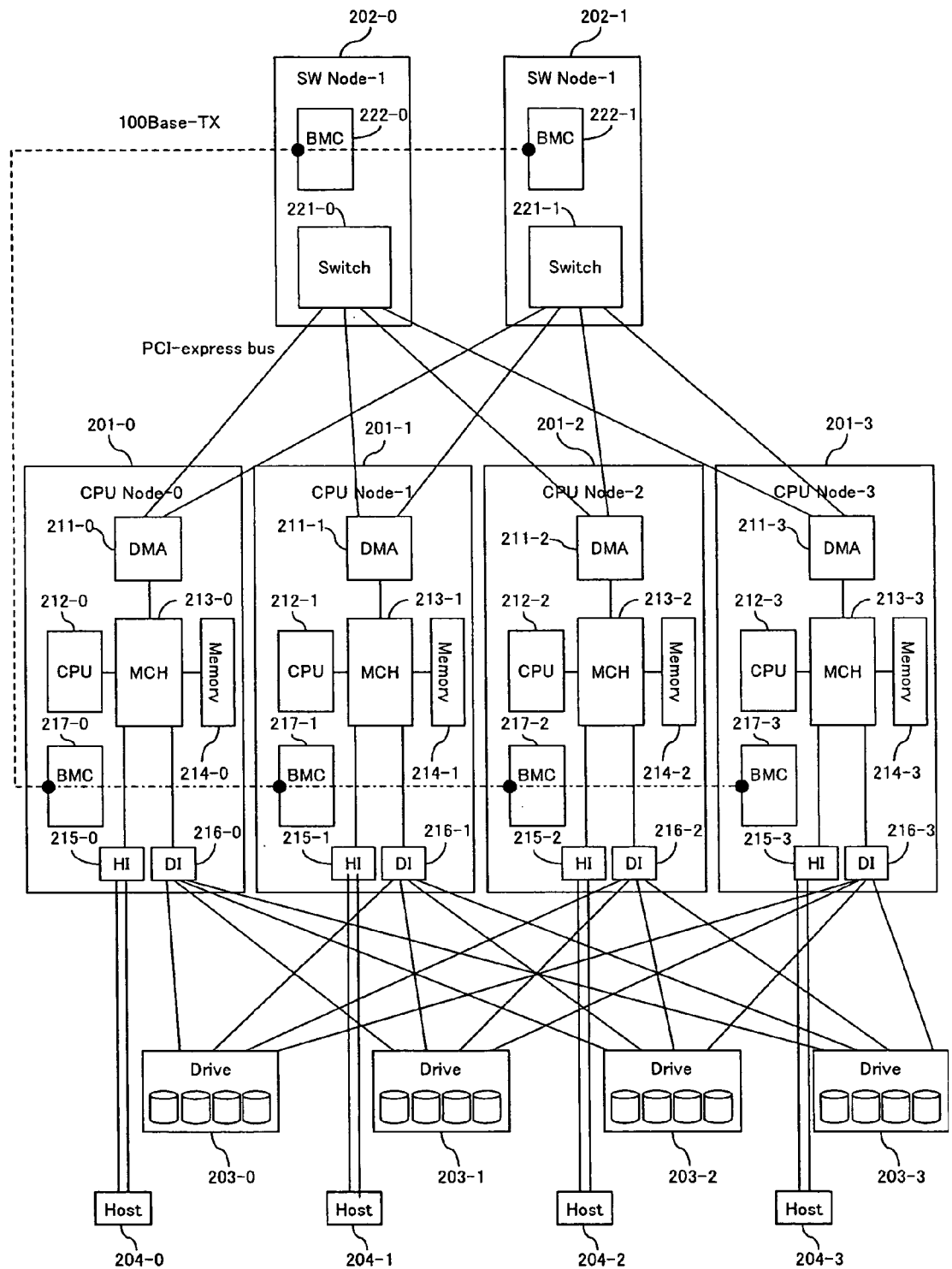
FIG. 2B shows the configuration of a disk array device.

FIG. 2B shows the configuration of the computer system in this preferred embodiment. Although a disk array device is shown as an example here, the application field of the present invention is not limited to this. The disk array device shown in FIG. 2B comprises four CPU units 201-0~201-3, two switch units 202-0 and 202-1 and four disk arrays 203-0~203-3. The CPU units 201-0~201-3 and switch units 202-0 and 202-1 are connected by a PCI-express bus. Each disk array comprises a plurality of disk devices.

A CPU unit 201-$i$ ($i$=0, 1, 2 and 3) comprises a direct memory access (DMA) controller 211-$i$, a CPU212-$i$, a memory controller 213-$i$, memory 214-$i$, a host interface (HI) 215-$i$, a disk interface (DI) 216-$i$ and a BMC 217-$i$.

The memory controller 213-$i$ transfers data between the DMA controller 211-$i$ and memory 214-$i$, and between the memory 214-$i$ and host interface 215-$i$ or disk interface 216-$i$ under the control of the CPU 212-$i$.

Each of the host interface 215-$i$ and disk interface 216-$i$ comprises a plurality of ports. The host interface 215-$i$ communicates with an external host computer 204-$i$, and the disk interface 216-$i$ accesses to the disk arrays 203-0~203-3 to read/write data.

In the host interface 215-$i$, a variety of protocol, such as a fiber channel, an internet small computer systems interface (iSCSI), an enterprise system connection (ESCON) and the like are used depending the type of a connected host computer 204-$i$ and data transfer usage. In the disk interface 216-$i$, protocols, such as a fiber channel, a serial AT attachment (ATA) and the like are used, depending on the type of a disk device used as a disk array.

The switch unit 202-$j$ ($j$=0 and 1) comprises a PCI-express switch 221-$j$ and a BMC 222-$j$. The switch 221-$j$ is connected to the DMA controllers 211-0~211-3 by a PCI-express bus, and realizes data transfer among arbitrary CPU units by switching a port.

The BMC 217-0~217-3, 222-0 and 222-1 are connected to each other by a particular communication channel. In this example, BMCs are connected by Ethernet (registered trade mark) of a 100Base-TX and communication is conducted.

Although the configuration shown in FIG. 2B is provided with four CPU units, the same operation is possible even when the number of CPU units increase/decreases. Although two switch units are provided for the purpose of the redundancy of a system and the improvement of performance, only one switch unit can also transfer data among arbitrary CPU units. Although in the following description, the operation of the switch unit 202-0 is mainly mentioned, the operation of the switch unit 202-1 is the same as this.

Each CPU unit 201-$i$ writes or reads user data into/from the disk arrays 203-0~203-3 according to a write/read request received from the host computer 204-$i$.

In this case, the CPU unit 201-$i$ plays the role of the disk cache of the host computer 204-$i$. Specifically, the CPU unit 201-*i* improve its response speed viewed from the host computer 204-*i* by temporarily storing user data received from the host computer 204-*i* in the memory 214-*i* instead of immediately writing it in the disk device and responding by reading the data from the memory 214-*i* instead of reading the data from the disk device when receiving a read request.

Although the response speed can be improved by caching data to be stored in the disk device in the memory 214-*i* thus, the memory 214-*i* is far inferior to the disk device in respect of reliability. Since the memory 214-*i* is volatile, there is a risk that data may be lost in power failure or the like.

In order to avoid this risk, the mirroring of cache data is performed in the disk array device. By not only storing user data received by one CPU unit 201-*m* (called "master") in the memory 214-*m* of the CPU unit 201-*m* but also copying it to the memory 214-*n* of another CPU unit 201-*n* (called "slave"), a request from the host computer 204-*m* can be satisfied using the data in the memory 214-*n* of the slave even when the data in the memory 214-*m* of the master are lost.

When copying data to the memory 214-*n* of another CPU unit 201-*n*, the CPU unit 201-*m* transfers data packeted using the DMA controller 211-*m* via the switch unit 202-0. When transferring data, the DMA controller 211-*m* transmits data and an address as a packet. In this case, this address includes the memory address in a partner CPU unit 201-*n* and a routing address in the switch unit 202-0.

Figure 3:
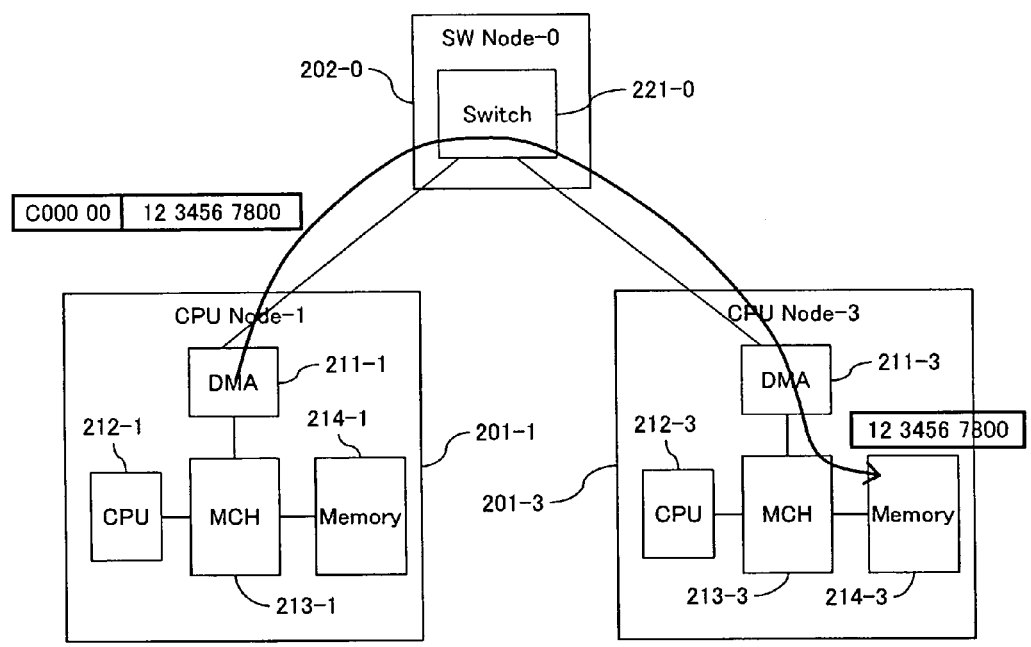
FIG. 3 shows how to copy data.

Here, two addresses handled by the DMA controller 211-1 are described with reference to FIG. 3 using a case where the CPU unit 201-1 writes data into the memory 214-3 of the CPU unit 201-3.

A memory address in each CPU unit is assigned, for example, using 40 bits. An address that can be specified using 40 bits is 1 TB, memory with a more capacity than this will not be supported in the near future.

The switch 221-0 can handle 64 bits of address, and is configured in such a way that the transfer destination address of a received packet can be determined by an address corresponding to the two higher-order bits, [63:62]. If the address [63:62] is '00', '01', '10' and '11' the packet is transferred to the CPU units 201-0, 201-1, 201-2 and 201-3, respectively.

When writing data into the address '0x12_3456_7800' of the memory 214-3 of the CPU unit 201-3, the DMA controller 211-1 of the CPU unit 201-1 specifies '0xC000_0012_3456_7800' as an address to be attached to the packet. The switch 221-0 transfers the packet to the CPU unit 201-3, using these two higher-order bits of the packer address as routing information.

Upon receipt of the packet, the DMA controller 211-3 of the CPU unit 201-3 extracts only '00x12_3456_7800' corresponding to the 40 lower-order bits of the address and transfer it to the memory controller 213-3.

FIG. 4 shows an address map viewed from the side of the DMA controller of each CPU unit. Since two higher-order bits are used as a routing address, the following combinations of an address range and a transfer destination CPU unit are set in a DMA controller.

| | |
|---|---|
| 0 x 0000_0000_0000_0000 ~0 x 3FFF_FFFF_FFFF_FFFF: | CPU unit 201-0 |
| 0 x 4000_0000_0000_0000 ~0 x 7FFF_FFFF_FFFF_FFFF: | CPU unit 201-1 |
| 0 x 8000_0000_0000_0000 ~0 x BFFF_FFFF_FFFF_FFFF: | CPU unit 201-2 |
| 0 x C000_0000_0000_0000 ~0 x FFFF_FFFF_FFFF_FFFF: | CPU unit 201-3 |

When the power of the system is switched on, the BMC of each unit starts to operate and synchronously cancels the reset of its own unit. In this case, the BMC 222-0 of the switch unit 202-0 cancels the reset of the switch 221-0 after selecting the upstream port of the switch 221-0. Initially, for example, a port to be connected to the CPU unit 201-0 is selected as an upstream port.

If the CPU unit 201-0 normally operates, initialization sequence is automatically applied to the PCI-express link between the switch 221-0 and CPU unit 201-0. Then, a link is established and becomes operable. Then, initialization sequence is also applied to ports other than the upstream port of the switch 221-0. Then, links are established and the entire system becomes operable.

If no CPU unit 201-0 exists or it does not normally operate, the PCI-express link is not established between the switch 221-0 and CPU unit 201-0. In this case, initialization sequence cannot be applied to the remaining ports of the switch 221-0, and the entire system cannot operate.

In this case, the BMC 222-0 of the switch unit 202-0 checks the mounted status of the CPU units 201-0~201-3, and selects one of the mounted CPU units as an upstream port.

After canceling the reset, the BMC 222-0 monitors whether the link of the switch 221-0 is established. If the link is not established even after a specific time elapses, it selects another port as an upstream port and resets the switch 221-0. If the CPU unit newly selected as an upstream device does not operate normally, it further selects another port, and sequentially changes an upstream port. Thus, the same process is repeated until an operable CPU unit is found.

However, if an upstream port is changed thus, the address map of the switch 221-0 changes consequently as long as the specification of a PCI-express switch is followed. This reason is described below with reference to FIG. 5.

In the specification of a PCI-express switch, there are two registers of a "prefetchable memory base address register (hereinafter called "base address register")" and a "prefetchable memory limit address register (hereinafter called "limit address register")" as configuration registers, and the address range of each port can be specified. However, the respective meanings of an address stored by these registers differ between an upstream and ports other than it (downstream ports).

In a downstream port, a packet with an address in the range between the two respective values of the limit address register 503 and base address register 504 is routed to the relevant port. However, in an upstream port, a packet with an address in the range between the two respective values of the limit address register 501 and base address register 502 is not routed to the relevant port, but a packet with other than the address is routed to the relevant port.

For this reason, only a range including the top or bottom address of the entire address map can be specified as an address range of a packet which is routed to an upstream port, and only an intermediate range cannot be specified. For example, in the address map shown in FIG. 4, a "range of a packet which is routed to the CPU unit 201-1" cannot be set in an upstream port.

Figure 5:
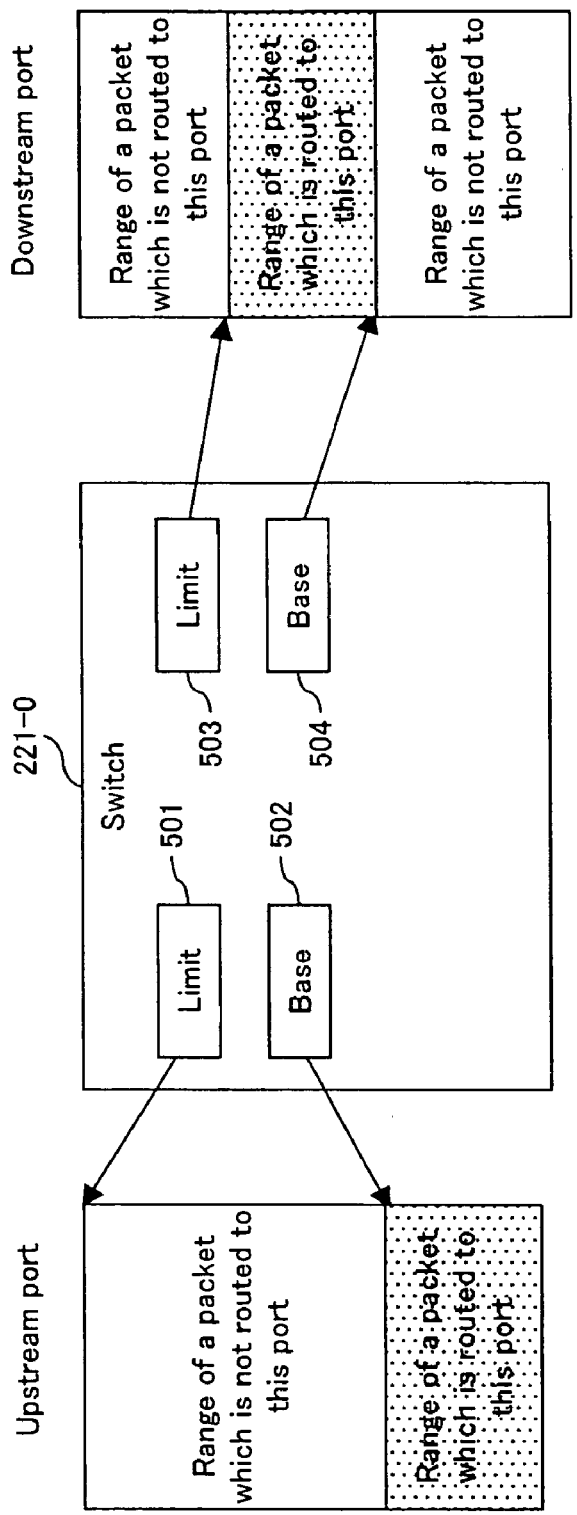
FIG. 5 explains a register for instructing an address range.

Thus, since the address map of the switch 221-0 cannot be fixed at all times as shown in FIG. 5, as shown in FIG. 6, one of four types of address maps must be properly used according to a selected upstream port. In the example shown in FIG. 6, a range '0x0000_0000_0000_0000'~'0x3FFF_FFFF_FFFF_FFFF' at the bottom of the address map is assigned to an upstream port.

This proper use is realized by modifying the setting of an address to be specified when the DMA controller 211-*i* of each CPU unit 201-$i$ generates a packet. The BMC 217-$i$ of the CPU unit 201-$i$ instructs the DMA controller 211-$i$ to modify the address setting.

Figure 7:
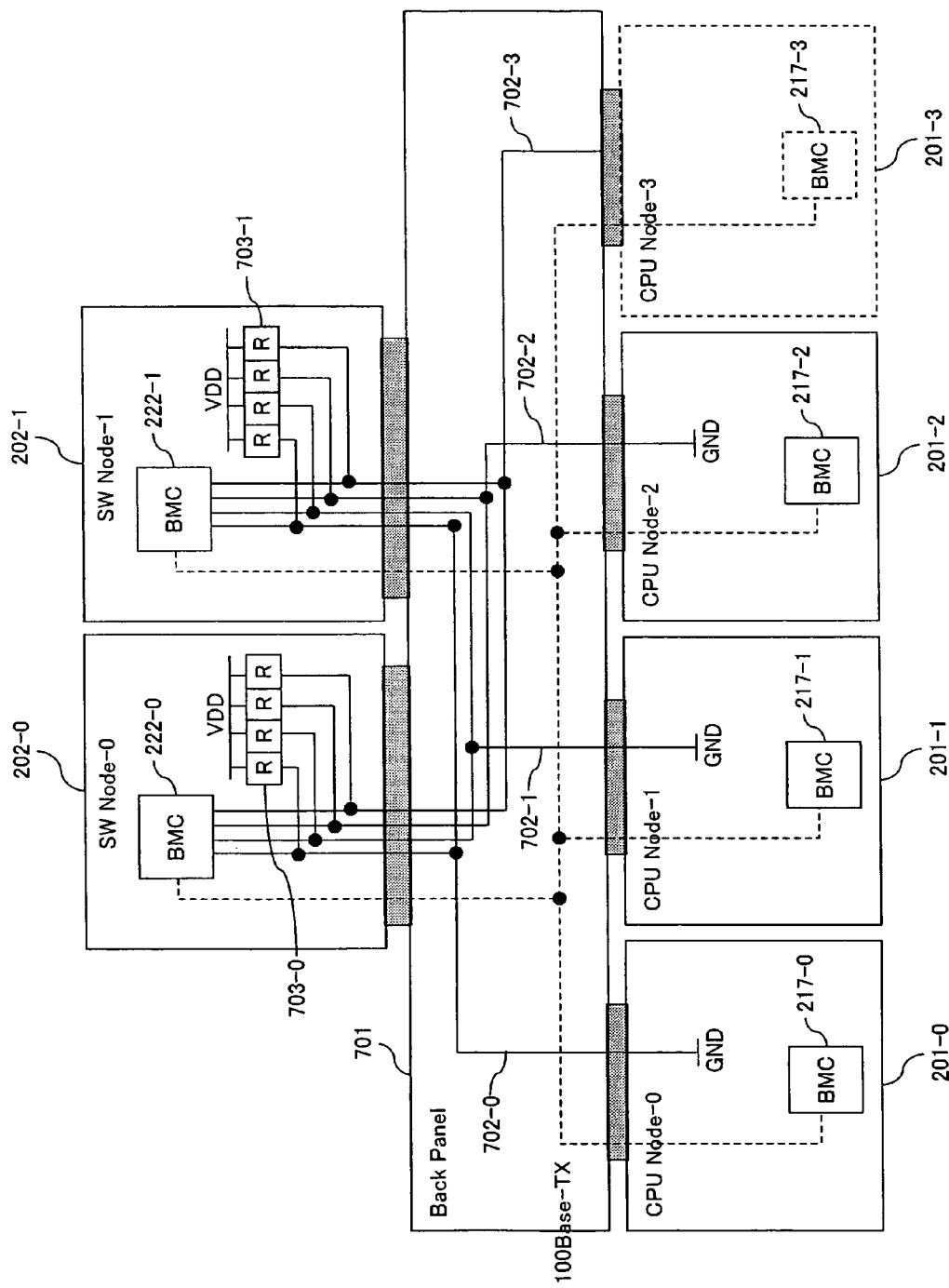
FIG. 7 shows a back panel.

FIG. 7 shows a back panel for connecting the CPU units 201-0~201-3 to the switch units 202-0 and 202-1. A signal wire 702-$i$ for detecting whether each CPU unit 201-$i$ exists is connected to the BMC 222-$j$ of the switch unit 202-$j$ via a back panel 701. This signal wire 702-$i$ is pulled up to a specific voltage VDD via a resistor 703-$j$ in the switch unit 202-$j$. However, it is connected to the ground level in the CPU unit 201-$i$.

Thus, the BMC 222-$j$ can check whether a corresponding CPU unit 201-$i$ is mounted, by checking whether a signal in the signal wire 702-$i$ is at a level "L" or "H". In the example shown in FIG. 7, since the CPU units 201-0~201-2 are mounted, the signal levels in the signal wires 702-0~702-2 become "L". Since the CPU unit 201-3 is not mounted, the signal level in the signal wire 702-3 becomes "H".

Figure 8:
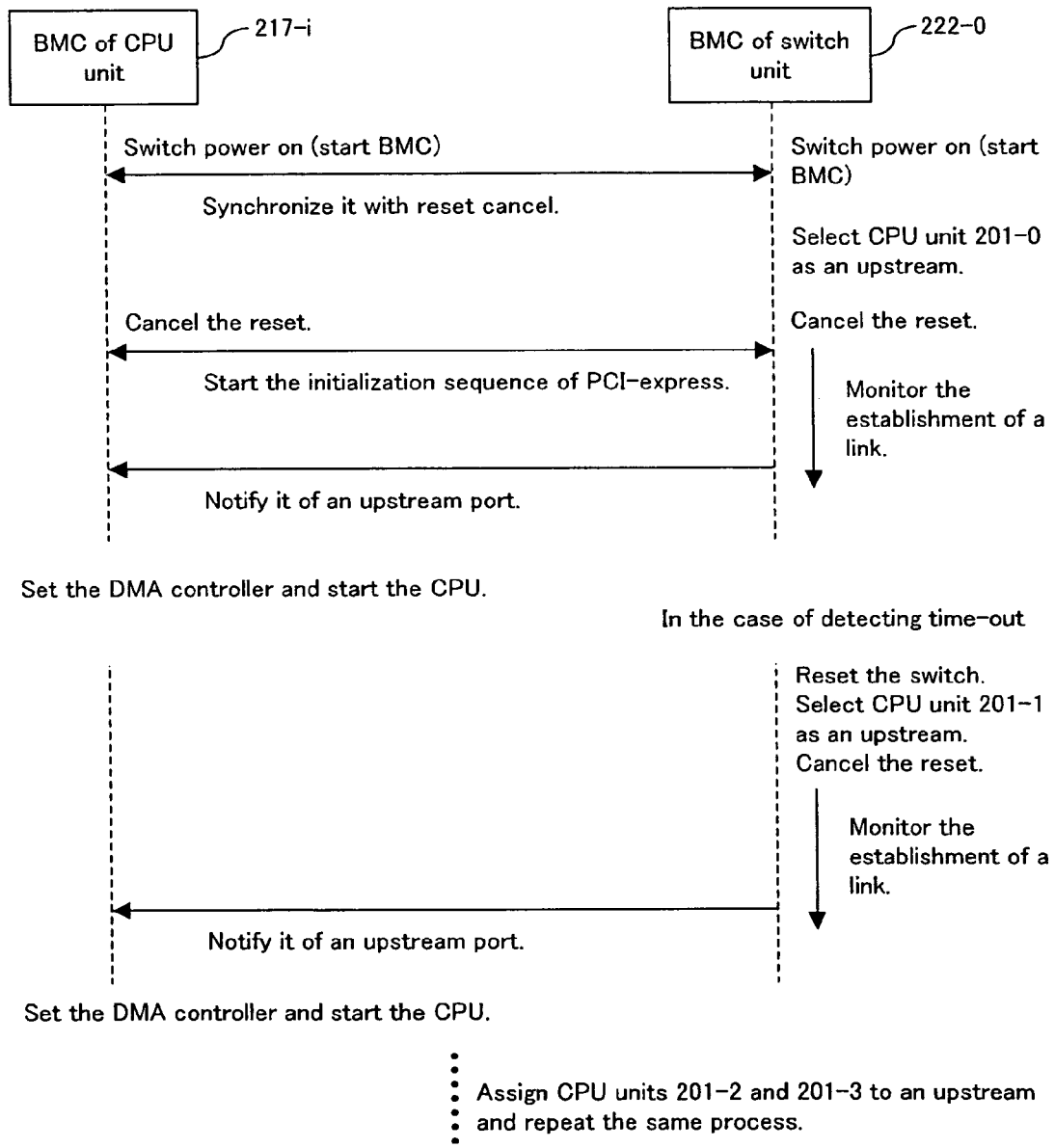
FIG. 8 is a sequence chart showing the operation of a board management controller (BMC).

FIG. 8 is a sequence chart showing the respective operations of BMCs 217-I and 222-0 in the case where the respective power of each CPU unit 201-$i$ and switch unit 202-0 is switched on. In this case, each of the BMCs 217-$i$ and 220-0 operates as follows.

1. The power of the system is switched on, and the CPU unit 212-$i$ and switch 221-0 are reset.
2. The BMCs 217-$i$ and 222-0 of each unit starts. The BMC 222-0 confirms that the CPU units 201-0~201-3 are mounted.
3. The BMC 222-0 assigns the CPU unit 201-0 as the upstream port of the switch 221-0.
4. The BMC 217-$i$ is synchronized with the BMC 222-0, and the respective reset of the CPU 212-$i$ and the switch 221-0 is cancelled.
5. The BMC 222-0 monitors the link status of the switch 221-0. When a link is established, the BMC 271-$i$ is notified that the CPU unit 201-0 is assigned as an upstream port.
6. Upon receipt of a notice from the BMC 222-0, the BMC 217-$i$ sets the DMA controller 211-$i$, using the CPU unit 201-0 as an upstream port.
7. The BMC 217-$i$ starts the CPU 212-I, and as a result, the CPU unit 201-$i$ operates.

If in the above item 5, a link is not established and time-out is detected, the BMC 222-0 resets the switch 221-0 and cancels the reset after assigning the CPU unit 201-1 as an upstream port. Then, the CPU unit 201-0 is replaced with the CPU unit 201-1, and the operation of the above item 5 and after is performed. If time-out is further detected, the BMC 222-0 sequentially changes the upstream port to the CPU units 201-2 and 201-3, and the same operation is performed.

If one of the CPU units is not mounted in the above item 2, in the above items 3 and after, a subsequence CPU unit is selected.

Figure 9:
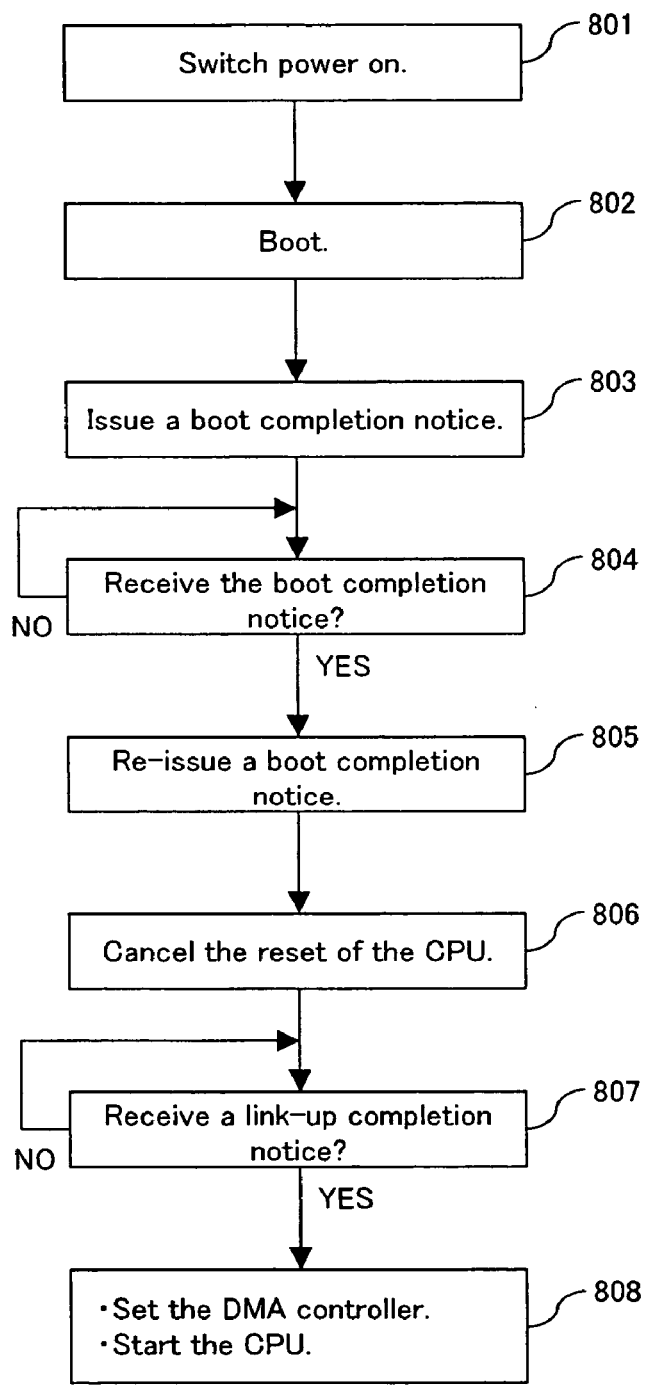
FIG. 9 is a flowchart showing the operation of the BMC of the CPU unit.

FIG. 9 is a flowchart showing the operation of the BMC 217-$i$ of each CPU unit 201-$i$. When the power of the system is switched on, the CPU 212-$i$ is reset (step 801), and the BMC 217-$i$ loads a program by a boot operation (step 802). After the boot operation is completed, a boot completion notice is issued to the BMC 222-0 of the switch 221-0 at specific intervals (step 803), and it is checked whether the boot completion notice is received from the BMC 222-0 (step 804).

If the boot completion notice is not received, the BMC 217-$i$ repeats the operation in step 804. Upon receipt of the boot completion notice, BMC 217-$i$ re-issues the boot completion notice in order to avoid its crossing (step 805).

Then, the BMC 217-$i$ cancels the reset of the CPU 212-$i$ (step 806), and checks whether a link-up completion notice is received from the BMC 222-0 (step 807).

If the link-up completion notice is not received, the BMC 217-$i$ repeats the operation in step 807. Upon receipt of the link-up completion notice, it assigns one of the CPU units as an upstream port, according to the assignment information of an upstream, contained in the notice, and sets the address map of the DMA controller 221-$i$. Then, the BMC 217-$i$ starts the CPU 212-$i$ (step 808).

Figure 10:
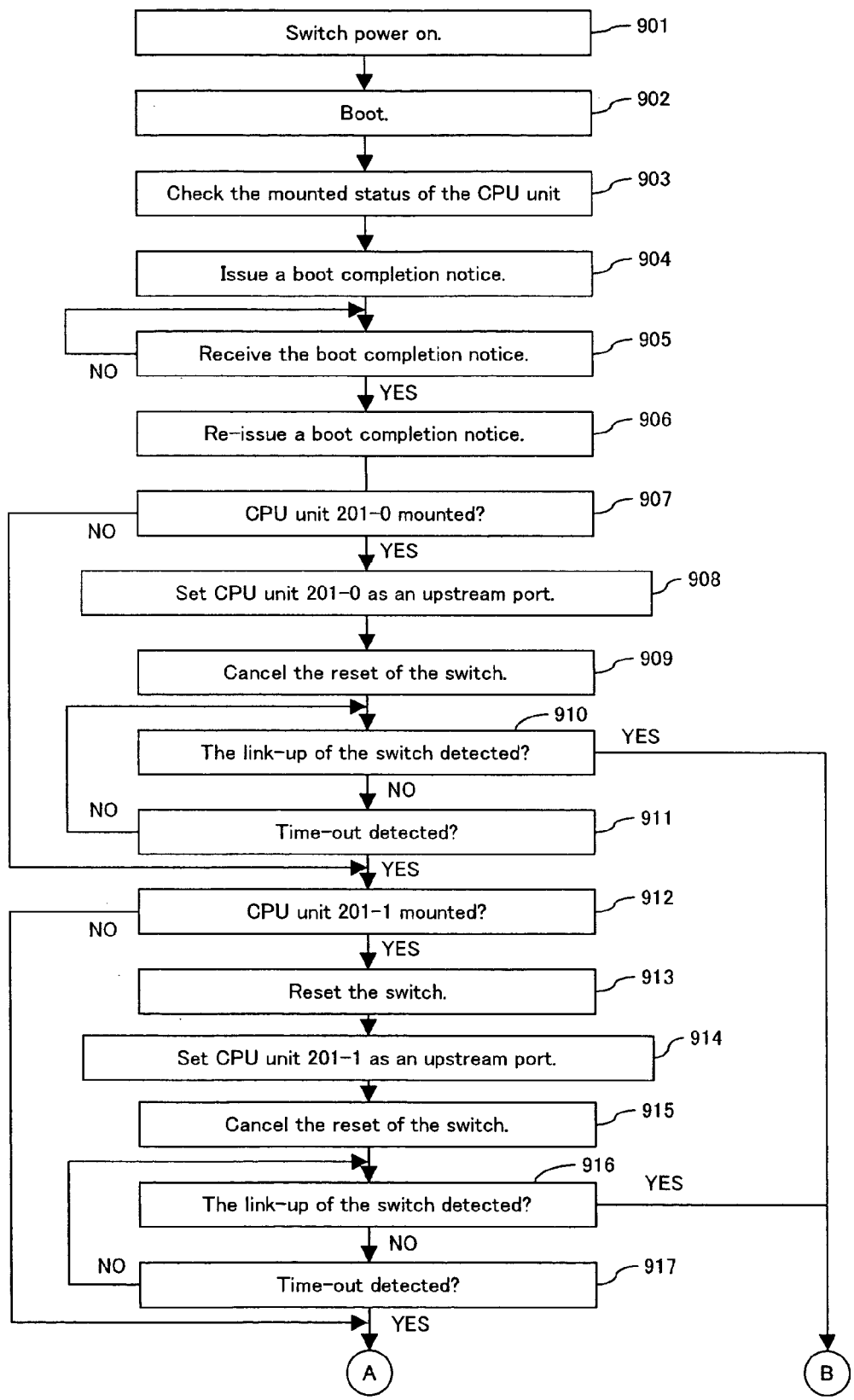
FIG. 10 is a flowchart showing the operation of the BMC of the switch unit (No. 1).
Figure 11:
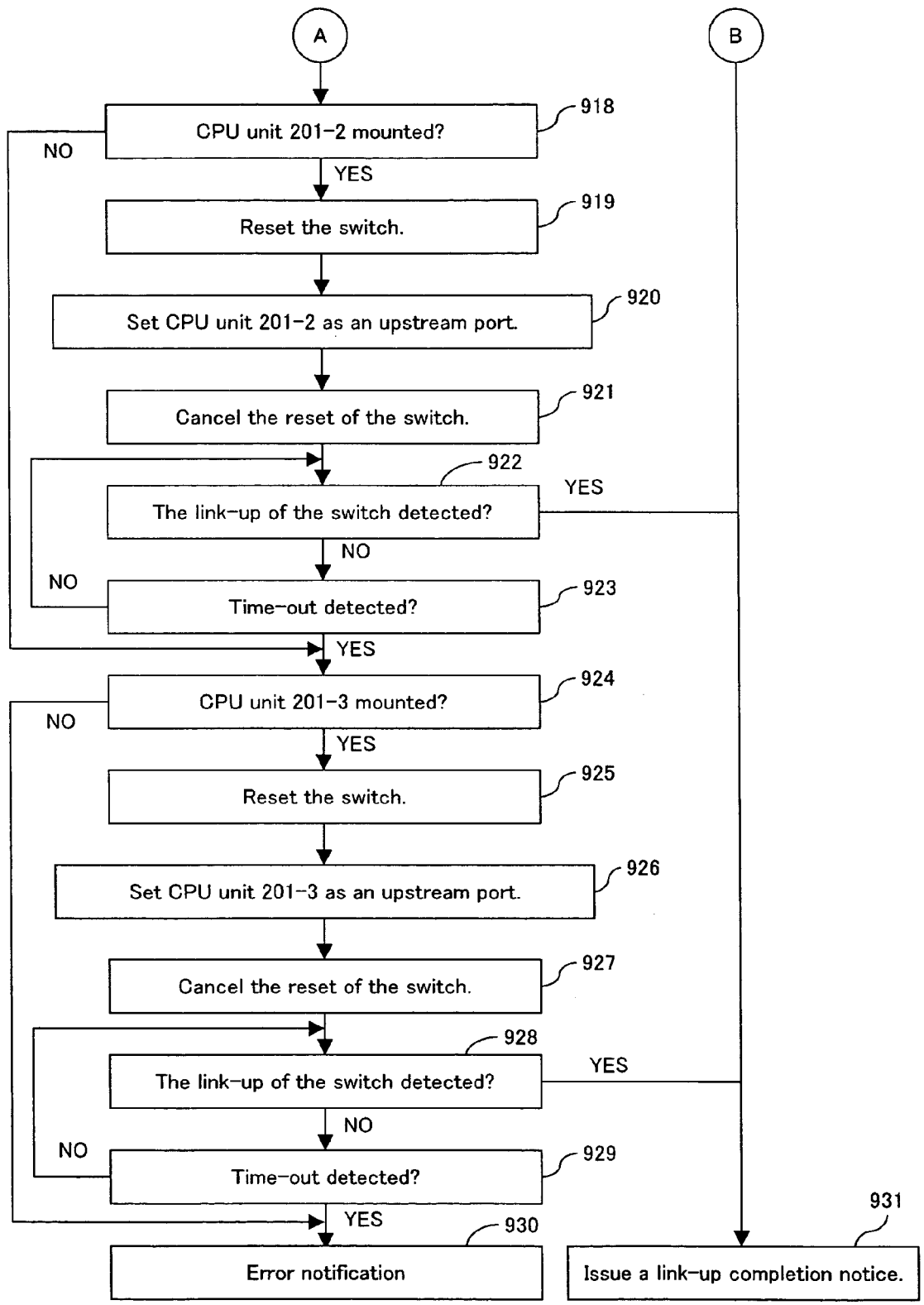
FIG. 11 is a flowchart showing the operation of the BMC of the switch unit (No. 2).

FIGS. 10 and 11 are flowcharts showing the operation of the BMC 222-0 of the switch unit 202-0. When the power of the system is switched on, the switch 221-0 is reset (step 901 in FIG. 10), the BM222-0 performs a boot operation (step 902). Then, after the boot operation is completed, the BMC 222-0 checks which of the CPU units 201-0~201-3 is mounted, by the method shown in FIG. 7 (step 903).

Then, the BMC 222-0 issues a boot completion notice to the BMC 217-$i$ of each mounted CPU unit 201-$i$ at specific intervals (step 904), and checks whether the boot completion notice is received from the BMC 217-$i$ (step 905).

If no boot completion notice is received from any of the mounted CPU units, the BMC 222-0 repeats the operation in step 905. When receiving the boot completion notice from all the CPU units, the BMC 222-0 re-issues the boot completion notice to each unit in order to avoid its crossing (step 906).

Then, the BMC 222-0 checks whether the CPU unit 201-0 is mounted (step 907). If it is mounted, the BMC 222-0 assigns the CPU unit 201-0 as the upstream port of the switch 221-0 (step 908). More specifically, the following addresses are set in the limit and base address registers of each port of the switch 221-0 in such a way that the address map at the left end shown in FIG. 6 can be realized.

(1) Port Connected to the CPU Unit 201-0
　Limit address register: 0xFFFF_FFFF_FFFF_FFFF
　Base address register: 0x4000_0000_0000_0000
(2) Port Connected to the CPU unit 201-1
　Limit address register: 07FFFF_FFFF_FFFF_FFFF
　Base address register: 0x4000_0000_0000_0000
(3) Port Connected to the CPU unit 201-2
　Limit address register: 0xBFFF_FFFF_FFFF_FFFF
　Base address register: 0x8000_0000_0000_0000
(4) Port Connected to the CPU Unit 201-3
　Limit address register: 0xFFFF_FFFF_FFFF_FFFF
　Base address register: 0xC000_0000_0000_0000

If in step 907 the CPU unit 201-0 is not mounted, the operations in step 912 and after are performed to assign another CPU unit as an upstream port.

Then, the BMC 222-0 cancels the reset of the switch 221-0 (step 909), and checks whether the link-up of the switch 221-0 is detected (step 910).

If no link-up is detected, then the BMC 222-0 checks whether time-out is detected (step 911). If neither link-up nor time-out is detected, the operations in step 910 and after are repeated. If the link-up is detected, the BMC 222-0 issues a link-up completion notice to the NMC 217-$i$ of each CPU unit 201-$i$ (step 931 in FIG. 11). This link-up completion notice contains information indicating a CPU unit assigned as an upstream port.

If no link-up is detected and time-out is detected, the BMC 222-0 checks whether the CPU unit 201-1 is mounted (step 912). If it is mounted, the BMC 222-0 resets the switch 221-0 (step 913), and assigns the CPU unit 201-1 as the upstream port of the switch 221-0 (step 914). More specifically, the following addresses are set in the limit and base address registers of each port of the switch 221-0 in such a way that the second address map from the left end shown in FIG. 6 can be realized.
(1) Port Connected to the CPU Unit 201-0
  Limit address register: 0xFFFF_FFFF_FFFF_FFFF
  Base address register: 0xC000_0000_0000_0000
(2) Port Connected to the CPU Unit 201-1
  Limit address register: 0xFFFF_FFFF_FFFF_FFFF
  Base address register: 0x4000_0000_0000_0000
(3) Port Connected to the CPU Unit 201-2
  Limit address register: 0x7FFFF_FFFF_FFFF_FFFF
  Base address register: 0x4000_0000_0000_0000
(4) Port Connected to the CPU Unit 201-3
  Limit address register: 0xBFFF_FFFF_FFFF_FFFF
  Base address register: 0x8000_0000_0000_0000

If in step 912 the CPU unit 201-1 is not mounted, the operations in step 918 and after in FIG. 11 are performed to assign another CPU unit as an upstream port.

Then, the BMC 222-0 performs the same operations as in steps 909~911 (step 915~917).

If time-out is detected in step 917, the BMC 222-0 checks whether the CPU unit 201-2 is mounted (step 918 in FIG. 11). If it is mounted, the BMC 222-0 resets the switch 221-0 (step 919), and assigns the CPU unit 201-2 as the upstream port of the switch 221-0 (step 920). More specifically, the following addresses are set in the limit and base address registers of each port of the switch 221-0 in such a way that the second address map from the right end shown in FIG. 6 can be realized.
(1) Port Connected to the CPU Unit 201-0
  Limit address register: 0xBFFF_FFFF_FFFF_FFFF
  Base address register: 0x8000_0000_0000_0000
(2) Port Connected to the CPU Unit 201-1
  Limit address register: 0xFFFF_FFFF_FFFF_FFFF
  Base address register: 0xC000_0000_0000_0000
(3) Port Connected to the CPU Unit 201-2
  Limit address register: 0xFFFF_FFFF_FFFF_FFFF
  Base address register: 0x4000_0000_0000_0000
(4) Port Connected to the CPU Unit 201-3
  Limit address register: 0x7FFF_FFFF_FFFF_FFFF
  Base address register: 0x4000_0000_0000_0000

If in step 918 the CPU unit 201-2 is not mounted, the operations in step 924 and after are performed to assign another CPU unit as an upstream port.

Then, the BMC 222-0 performs the same operations as in steps 909~911 (step 921~923).

If time-out is detected in step 923, the BMC 222-0 checks whether the CPU unit 201-3 is mounted (step 924). If it is mounted, the BMC 222-0 resets the switch 221-0 (step 925), and assigns the CPU unit 201-3 as the upstream port of the switch 221-0 (step 926). More specifically, the following addresses are set in the limit and base address registers of each port of the switch 221-0 in such a way that the address map at the right end shown in FIG. 6 can be realized.
(1) Port Connected to the CPU Unit 201-0
  Limit address register: 0x7FFF_FFFF_FFFF_FFFF
  Base address register: x4000_0000_0000_0000
(2) Port Connected to the CPU Unit 201-1
  Limit address register: 0xBFFF_FFFF_FFFF_FFFF
  Base address register: 0x8000_0000_0000_0000
(3) Port Connected to the CPU Unit 201-2
  Limit address register: 0xFFFF_FFFF_FFFF_FFFF
  Base address register: 0xC000_0000_0000_0000
(4) Port Connected to the CPU Unit 201-3
  Limit address register: 0xFFFF_FFFF_FFFF_FFFF
  Base address register: 0x4000_0000_0000_0000

Then, the BMC 222-0 performs the same operations as in steps 909~911 (step 927~929).

If time-out is detected in step 929 or if the CPU unit 201-3 is not mounted in step 924, the BMC 222-0 notifies a user that the system is not operable (step 930).

As described above, in order to realize the present invention, the upstream port of the PCI-express switch must be able to be freely selected. However, this is not a function defined in the specification of the PCI-express switch, and its selection method also varies depending on the mounting of a switch integrated circuit (IC).

FIG. 12 shows an example of the configuration of the switch unit. A PCI-express switch 1101 shown in FIG. 12 can select an upstream port by external strap pins (strap ports) UPSTREAM_SEL_0 and UPSTREAM_SEL_1, and sets internal registers by an I2C bus. In this case, after selecting an upstream port by the general purpose I/O (GPIO) of a BMC 1102, the PCI-express switch 1101 cancels the reset, and performs a proper register setting in order to set the address map of the switch 1101 from the I2C bus.

FIG. 13 shows the configuration of the first PCI-express switch 1101 shown in FIG. 12. The IC of the switch 1101 comprises a crossbar switch 1201, an I2C control unit 1202 and four PCI-express switche ports #0~#3 for the outside.

Each port #i (i=0, 1, 2 and 3) comprises a serializer/deserializer (SERDES) unit 1203-i, an PCI-express protocol control unit 1204-i, a selection circuit 1205-i and a configuration register set regulated in the specification of the PCI-express switch.

The SERDES unit 1203-i converts a high-speed serial signal connected to the outside of the IC into a parallel bus signal connecting the inside of the ICs and vice versa. The protocol control unit 1204-i performs a protocol process set forth in the specification of the PCI-express switch referring to the configuration register set. The crossbar switch 1201 switches a data transfer route among these four ports.

Since the configuration register differs in its configuration between upstream and downstream ports, both an upstream port register set 1206-i and a downstream port register set 1207-i are provided. Each of the register sets 1206-i and 1207-i includes a limit address register and a base address register, and a selection circuit 1205-i exclusively selects one of the two types of resister sets.

In reality, the selection circuit of each port selects the upstream port register set 1206-i in such a way that only one of the four ports can become an upstream port, and the selection circuit of each of the other ports selects a downstream port resister set 1207-i.

Although the configuration register is usually set from the PCI-express port in the upstream, in this preferred embodiment, it is preferable to set the configuration register from the BMC 1102 by the interface of I2C or the like. In this case, the I2C control unit 1202 receives an access request from the BMC 1102, which is an external I2C master, and sets the configuration register according to the request.

In this case, the BMC 1102 writes the above-mentioned limit and base address register values into each of the upstream port register set 1206-i of a port assigned as an upstream port and the downstream port register set 1207-i of a port assigned as a downstream port.

The BMC 1102 further inputs a binary control signal (H or L) from two strap pins UPSTREAM_SEL_0 and UPSTREAM_SEL_1 in order to control the selection circuits 1205-0~1205-3 to select either the register set 1206-i or 1207-i. This control signal is, for example, defined as follows.

"LL": Assign port #0 and ports other than port #0 as an upstream port and downstream ports, respectively.

"LH": Assign port #1 and ports other than port #1 as an upstream port and downstream ports, respectively.

"HL": Assign port #2 and ports other than port #2 as an upstream port and downstream ports, respectively.

"HH": Assign port #3 and ports other than port #3 as an upstream port and downstream ports, respectively.

The respective selection circuits 1205-*i* of the upstream and downstream port selection circuit select an upstream port register set 1206-*i* and a downstream port register set 1207-*i*. Thus, the respective settings of upstream and downstream ports are completed.

The BMC 1102 inputs a control signal to each of the crossbar switch 1201, I2C control unit 1202, SERDES unit 1203-*i*, PCI-express protocol control unit 1204-*i* and register sets 1206-*i* and 1207-*i* via a reset port, and performs the reset/reset cancel of these units.

FIG. 14 shows the configuration of the BMC 1102. The BMC 1102 comprises a micro processing unit (MPU) 1301, an Ether-physical layer (PHY) circuits 1302-0 and 1302-1, a temperature/voltage monitor device 1303, a synchronous dynamic random-access memory (SDRAM) 1304, flash memory 1305 and a programmable logic device 1306.

The MPU 1301 is a processor developed to be built in, has two Ethernet (registration trademark) ports, an RS232C port, an I2C port and a CPU bus 1307. One Ethernet port is connected to another BMC via the Ether-PHY circuit 1302-1. The other Ethernet port is connected to a personal computer or the like via the Ether-PHY circuit 1302-0 and is used as a debug interface. The RS232C port is also connected to a personal computer or the like and is used for debug.

The I2C port is connected to the temperature/voltage monitor device 1303, and monitors whether temperature and power voltage are normal in the unit. The I2C port is also connected to the switch 1101, and is used for a register setting in the switch 1101.

To the CPU bus 1307, the SDRAM 1304, flash memory 1305 and PLD 1306 are connected. The SDRAM 1304 is the main memory of the BMC 1102, and a BMC program is loaded onto it. The flash memory 1305 is non-volatile memory for storing the program. The MPU 1301 performs necessary processes by executing the program loaded onto the SDRAM 1304.

The PLD 1306 comprises a register set 1308. When the contents of the register set 1308 are set by the MPU 1301, the PLD 1306 can control a GPIO port and a reset port. The PLD 1306 performs the reset/reset cancel of the switch 1101 via the reset port, and assigns the upstream port of the switch 1101 via the GPIO port. Furthermore, to the GPIO port, the signal wires 702-0~702-3 shown in FIG. 7 are connected. Thus, the PLD 1306 detects which CPU unit is mounted, and notifies the MPU 1301 of it.

The two pins GPIO_0 and GPIO_1 of the GPIO port are connected to the strap pins UPSTREAM_SEL_0 and UPSTREAM_SEL_1, respectively, shown in FIG. 13. When the MPU 1301 writes one of the above-mentioned four control signals into the register set 1308, the PLD 1306 transfers the written control signal to the switch 1101 via the GPIO pin. Thus, a port specified by the control signal is selected as an upstream port.

The BMC 2170-*i* of the CPU unit 201-*i* has the same configuration as the BMC 1102 shown in FIG. 14.

As a method for selecting the configuration register set of the PCI-express switch, the switch can also have electronically erasable and programmable read-only memory (EEPROM).

Figure 15:
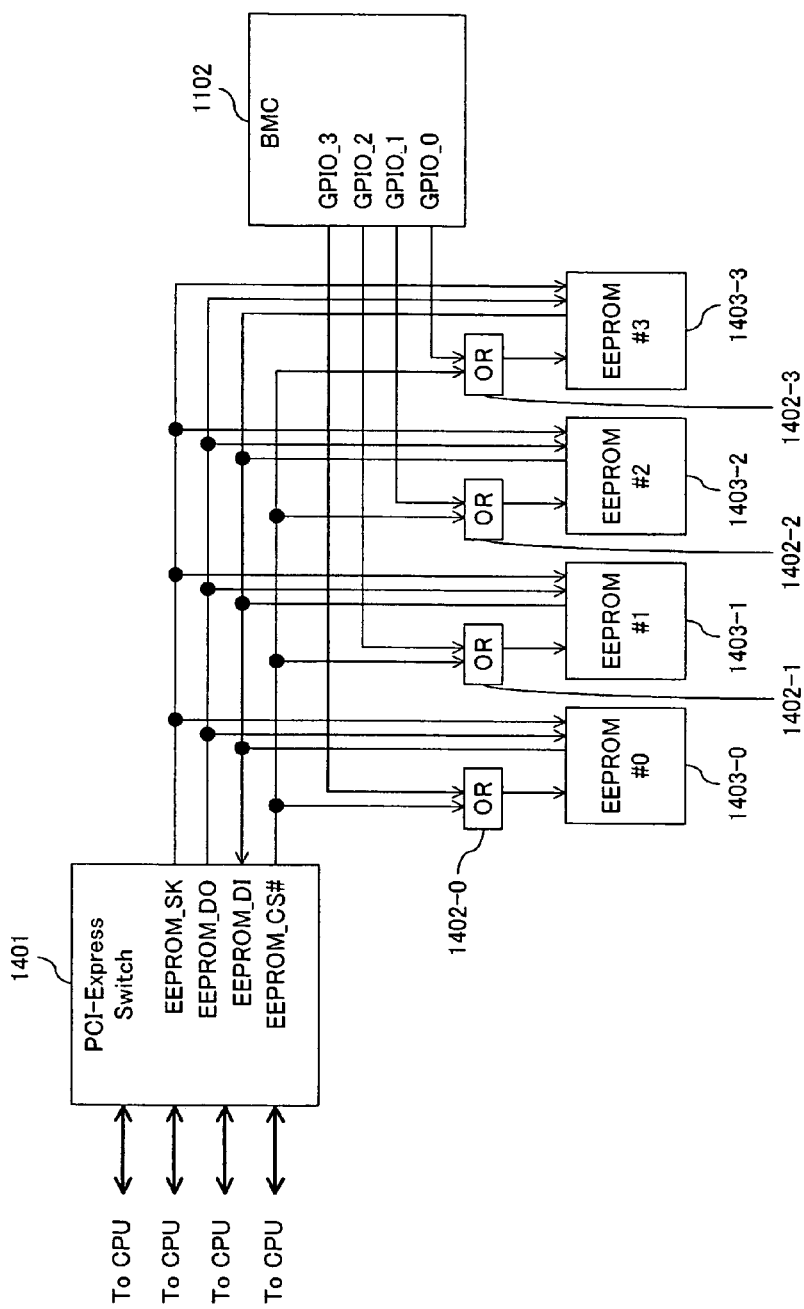
FIG. 15 shows the configuration of the second switch unit.

FIG. 15 shows an example of the configuration of the switch unit using such a switch. In the switch unit shown in FIG. 15, four pieces of EEPROM 1403-0~1403-3 are installed. In the EEPROM, for example, the each data with a different map shown in FIG. 6 is stored. When its reset is cancelled, the PCI-express switch 1401 automatically reads data from one of the EEPROM 1403-0~1403-3, and assigns a port corresponding to the data as an upstream port.

The BMC 1102 can control the OR circuits 1402-0~1402-3, using four pins GPIO_0~GPIO_3, and select a desired EEPROM. Thus, any port of the switch 1401 can be set as an upstream port.

FIG. 16 shows the configuration of the PCI-express switch 1401 shown in FIG. 15. The configuration of the switch 1401 shown in FIG. 16 can be obtained by deleting the Is2C control unit 1202 from the switch 1101 shown in FIG. 13 and adding an EEPROM control unit 1501.

Each of the EEPROM control unit 1501 and the EEPROM has a serial peripheral interface (SPI) bus as an interface. This SPI bus comprises four signal wires of EEPROM_SK, EEPROM_DO, EEPROM_DI and EEPROM_CS# ("#" indicates negative logic).

The EEPROM_CS# is a chip select signal to EEPROM. In the case of logic '0', the EEPROM is selected, and it indicates that data is loaded onto the switch 1401. The EEPROM control unit 1501 of the switch 1401 has only one of these signal wires. However, if the BMC 1102 sets one of GPIO_0~GPIO_3 to logic '0', and the remaining three to logic '1', only one of the OR circuits 1402-0~1402-3 outputs '0', and EEPROM_CS# of a EEPROM corresponding to it becomes '0'.

The EEPROM_SK is a clock signal to the EEPROM. According to this clock signal, the EEPROM control circuit 1501 transmits an address signal, and the EEPROM transmits read data.

In this case, the EEPROM control unit 1501 transmits an address signal to the EEPROM as serial data synchronous with the EEPROM_SK via the EEPROM_DO. When receiving the address signal, the EEPROM selected by the EEPROM_CS# transmits the read data as serial data synchronous with the EEPROM_SK via the EEPROM_DI. However, EEPROM that is not selected by the EEPROM_CS# keeps the signal wire of the EEPROM_DI in high impedance.

The switch 1401 sets an address map in the register set 1206-*i* or 1207-*i* of each port, according to data transmitted from the EEPROM, and switches the selection circuit 1205-*i*. Thus, the setting of upstream and downstream ports in the switch 1401 is completed.

Figure 17:
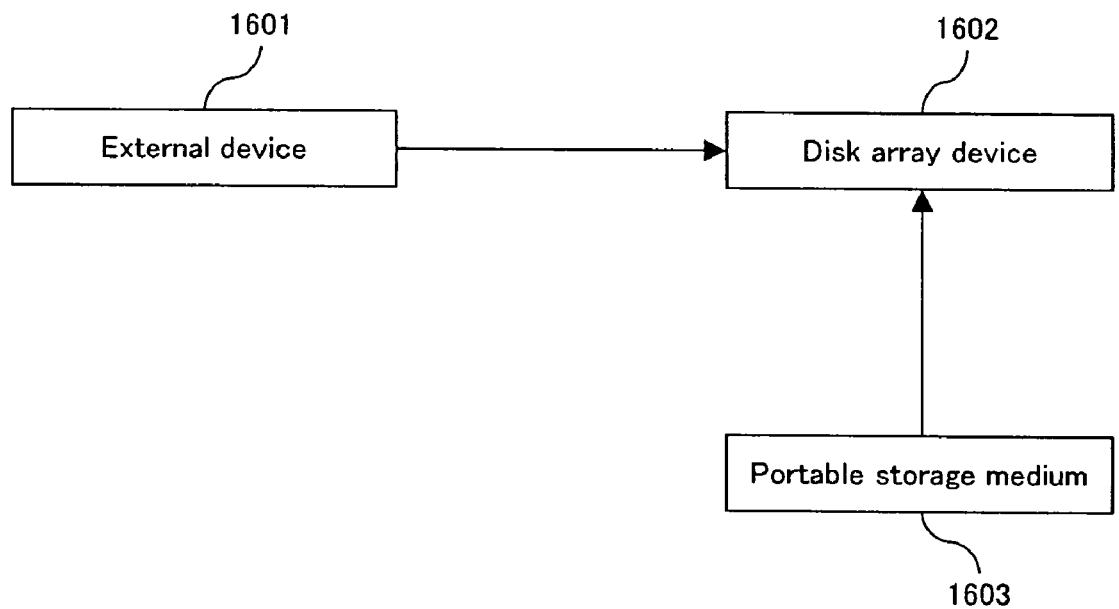
FIG. 17 shows how to provide a program and data.

FIG. 17 shows how to provide a program and data to be used by the BMC 217-*i* and 222-*j* of the disk array device shown in FIG. 2. The program and data stored in the external device 1601 of information processing device or the like or a portable storage medium 1603 are loaded onto the memory of a disk array device 1602.

The external device 1601 generates a carrier signal for carrying the program and data, and transmits it to the disk array device 1602 via an arbitrary transmission medium in a communication network. The portable storage medium 1603 is an arbitrary computer-readable storage medium, such as a memory card, a flexible disk, an optical disk, and a magneto-optical disk. Each of the BMC 217-*i* and 222-*j* performs necessary processes by using the data and executing the program.

What is claimed is:

1. An interconnect apparatus which interconnects a plurality of process nodes by a serial bus, comprising:
   a switch device provided with a plurality of ports connected to the plurality of process nodes, for assigning one of the plurality of ports and the other ports as an upstream port and downstream ports, respectively, and switching a data transfer route among the ports; and a control device for checking whether each of the plurality of process nodes is mounted before a link of each port of the switch device is established, and controlling the switch device in such a way as to assign a port to which one of mounted process nodes is connected, of the plurality of ports of the switch device, and the other ports as the upstream and downstream ports, and wherein each port of said switch device comprises
a first register device for specifying a range of a transfer destination of data that is not routed to the upstream port; and
a second register device for specifying a range of a transfer destination of data that is routed to a downstream port, and
the port assigned as the upstream port operates while referring to the first register device, and the port assigned as the downstream port operates while referring to the second register device.

2. The interconnect apparatus according to claim 1, wherein after the upstream and downstream ports of said switch device are assigned, said control device monitors whether a link of each port to which a mounted process node is connected is established, and if the link is not established, it controls said switch device to reset said switch device and to assign another port as an upstream port.

3. The interconnect apparatus according to claim 2 or 1, wherein each of the plurality of process nodes comprises
a direct memory access control device, and
said control device notifies a mounted process node of information about the assigned upstream port and the notified process node sets an address map of the direct memory access control device, according to the information about the upstream port.

4. The interconnect apparatus according to claim 2 or 1, wherein each port of said switch device comprises
a register device for storing an address map of a data transfer destination address, and
said control device writes information about an upstream port address map into the register device of a port which should be assigned as an upstream port, and information about a downstream port address map into the register device of a port which should be assigned as a downstream port.

5. The interconnect apparatus according to claim 2 or 1, further comprising
a memory device for storing information about of a plurality of different address maps in the case where each of the plurality of ports of said switch device is assigned as an upstream port,
wherein each port of said switch device comprises
a register device for storing an address map of a data transfer destination address, and
said control device controls the memory device such that information about a corresponding address map in the memory device according to which port is assigned as an upstream port.

6. A computer system, comprising:
a plurality of process nodes having a process unit;
a switch device with a plurality of ports for interconnecting the plurality of process nodes by a serial bus, for assigning one of the plurality of ports as an upstream port and the other ports as downstream ports, and switching a data transfer route among the ports; and
a control device for checking whether each of the plurality of process nodes is mounted before a link of each port of the switch device is established, and controlling the switch device to assign a port to which one of mounted process nodes is connected, of the plurality of ports of the switch device, and the other ports as the upstream and downstream ports, respectively, whereby the process nodes can play a special role of initializing an entire system, and wherein each port of said switch device comprises:
a first register device for specifying a range of a transfer destination of data that is not routed to the upstream port; and
a second register device for specifying a range of a transfer destination of data that is routed to a downstream port, and
the port assigned as the upstream port operates while referring to the first register device, and the port assigned as the downstream port operates while referring to the second register device.

7. A storage medium on which is recorded a program for enabling a processor to control a switch with a plurality of ports for interconnecting a plurality of process nodes by a serial bus, for assigning one of the plurality of ports as an upstream port and the other ports as downstream ports, and switching a data transfer route among the ports, each port of said switch device having a first register device for specifying a range of a transfer destination of data that is not routed to the upstream port, and a second register device for specifying a range of a transfer destination of data that is routed to a downstream port, and said program comprising:
checking whether each of the plurality of process nodes is mounted before a link of each port of the switch is established;
controlling the switch to assign a port to which one of mounted process nodes is connected, of the plurality of ports of the switch, and the other ports as the upstream and downstream ports, respectively, whereby the process nodes can play a special role of initializing an entire system;
operating the port assigned as the upstream port while referring to the first register device; and
operating the port assigned as the downstream port while referring to the second register device.

8. A control method for controlling a switch with a plurality of ports for interconnecting a plurality of process nodes by a serial bus, for assigning one of the plurality of ports as an upstream port and the other ports as downstream ports, and switching a data transfer route among the ports each port of said switch device having a first register device for specifying a range of a transfer destination of data that is not routed to the upstream port, and a second register device for specifying a range of a transfer destination of data that is routed to a downstream port, and said method comprising:
checking whether each of the plurality of process nodes is mounted before a link of each port of the switch is established;
controlling the switch to assign a port to which one of mounted process nodes is connected, of the plurality of ports of the switch device, and the other ports as the upstream and downstream ports, respectively, whereby the process nodes can play a special role of initializing an entire system;
operating the port assigned as the upstream port while referring to the first register device; and
operating the port assigned as the downstream port while referring to the second register device.

9. A computer readable storage for controlling a computer and storing a process enabling a processor to control a switch with a plurality of ports for interconnecting a plurality of process nodes by a serial bus, for assigning one of the plurality of ports as an upstream port and the other ports as downstream ports, and switching a data transfer route among the ports each port of said switch device having a first register device for specifying a range of a transfer destination of data that is not routed to the upstream port, and a second register device for specifying a range of a transfer destination of data that is routed to a downstream port, and said process comprising:

checking whether each of the plurality of process nodes is mounted before a link of each port of the switch is established;

controlling the switch to assign a port to which one of mounted process nodes is connected, of the plurality of ports of the switch, and the other ports as the upstream and downstream ports, respectively, whereby the process nodes can play a special role of initializing an entire systems;

operating the port assigned as the upstream port while referring to the first register device; and operating the port assigned as the downstream port while referring to the second register device.

10. An interconnect apparatus which interconnects a plurality of process nodes by a serial bus, comprising:

switch means provided with a plurality of ports connected to the plurality of process nodes, for assigning one of the plurality of ports and the other ports as an upstream port and downstream ports, respectively, and switching a data transfer route among the ports; and control means for checking whether each of the plurality of process nodes is mounted before a link of each port of the switch means is established, and controlling the switch means to assign a port to which one of mounted process nodes is connected, of the plurality of ports of the switch means, and the other ports as the upstream and downstream ports, respectively, whereby the process nodes can play a special role of initializing an entire system, and wherein each port of said switch means comprises:

a first register means for specifying a range of a transfer destination of data that is not routed to the upstream port; and a second register means for specifying a range of a transfer destination of data that is routed to a downstream port, and the port assigned as the upstream port operates while referring to the first register means, and the port assigned as the downstream port operates while referring to the second register means.

11. An interconnect apparatus which interconnects a plurality of process nodes by a serial bus, comprising:

a switch device provided with a plurality of ports connected to the plurality of process nodes, for assigning one of the plurality of ports and the other ports as an upstream port and downstream ports, respectively, and switching a data transfer route among the ports; and a control device for checking whether each of the plurality of process nodes is mounted before a link of each port of the switch device is established, and controlling the switch device to assign a port to which one of mounted process nodes is connected, of the plurality of ports of the switch device, and the other ports as the upstream and downstream ports, wherein after the upstream and downstream ports of said switch device are assigned, said control device monitors whether a link of each port to which a mounted process node is connected is established, and if the link is not established, it controls said switch device to reset said switch device and to assign another port as an upstream port, and wherein each port of said switch device comprises a first register device for specifying a range of a transfer destination of data that is not routed to the upstream port; and a second register device for specifying a range of a transfer destination of data that is routed to a downstream port, and the port assigned as the upstream port operates while referring to the first register device, and the port assigned as the downstream port operates while referring to the second register device.

\* \* \* \* \*

UNITED STATES PATENT AND TRADEMARK OFFICE
CERTIFICATE OF CORRECTION

PATENT NO. : 7,461,194 B2
APPLICATION NO. : 11/133335
DATED : December 2, 2008
INVENTOR(S) : Shigeyoshi Ohara et al.

Page 1 of 1

It is certified that error appears in the above-identified patent and that said Letters Patent is hereby corrected as shown below:

Column 15, Line 17, change "systems;" to --system;--.

Signed and Sealed this

Twenty-fourth Day of February, 2009

JOHN DOLL
*Acting Director of the United States Patent and Trademark Office*